(12) United States Patent
Eizner et al.

(10) Patent No.: US 12,399,133 B2
(45) Date of Patent: Aug. 26, 2025

(54) OPTICAL INSPECTION USING CONTROLLED ILLUMINATION AND COLLECTION POLARIZATION

(71) Applicant: Applied Materials Israel Ltd., Rehovot (IL)

(72) Inventors: Elad Eizner, Ness Ziona (IL); Amir Shoham, Ness Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 171 days.

(21) Appl. No.: 18/367,591

(22) Filed: Sep. 13, 2023

(65) Prior Publication Data

US 2023/0417683 A1    Dec. 28, 2023

Related U.S. Application Data

(63) Continuation-in-part of application No. 17/506,040, filed on Oct. 20, 2021, now Pat. No. 11,796,783.

(51) Int. Cl.
*G01N 21/95*    (2006.01)
*G01N 21/88*    (2006.01)

(52) U.S. Cl.
CPC . *G01N 21/9501* (2013.01); *G01N 2021/8848* (2013.01); *G01N 2201/063* (2013.01)

(58) Field of Classification Search
CPC ............ G01N 21/9501; G01N 21/211; G01N 2021/8848; G01N 2201/063; G02B 5/3025; G02B 21/0016; G02B 21/082; G02B 21/0092; G02B 21/06; G02B 27/286
See application file for complete search history.

(56) References Cited

U.S. PATENT DOCUMENTS 8,228,601 B2    7/2012  Meshulach et al.
10,295,476 B1 *  5/2019  Kirshner ............ G01N 21/9501
11,796,783 B2   10/2023  Eizner et al.
(Continued)

OTHER PUBLICATIONS

U.S. Appl. No. 17/506,040 Non-Final Office Action mailed Mar. 8, 2023, 27 pages.
(Continued)

*Primary Examiner* — Tarifur R Chowdhury
*Assistant Examiner* — Carlos Perez-Guzman
(74) *Attorney, Agent, or Firm* — Kilpatrick Townsend & Stockton LLP

(57) ABSTRACT

An optical inspection system, including (a) an illumination optics that is configured to generate an illumination light beam and to illuminate a sample with the illumination light beam; (b) at least one collection optics configured to collect light from the sample as a result of an impingement of the illumination light beam on the sample; (c) at least one detector configured to detect at least one detected light beam outputted from the at least one collection optics; (d) multiple polarizers that comprise at least one inhomogeneous polarizer and at least one half-wave plate; and (e) at least one movement unit that is configured to move, under a control of a control unit of the optical inspection system, the at least one inhomogeneous polarizer thereby impacting a polarization of one or more light beams out of the illumination light beam, and the at least one detected light beam.

21 Claims, 45 Drawing Sheets

(56) References Cited

U.S. PATENT DOCUMENTS

| | | | |
|---|---|---|---|
| 2007/0121106 A1* | 5/2007 | Shibata | G01N 21/8806 |
| | | | 356/237.2 |
| 2009/0244516 A1* | 10/2009 | Mehendale | G01N 21/211 |
| | | | 356/33 |
| 2009/0284835 A1 | 11/2009 | Meshulach et al. | |
| 2014/0118820 A1* | 5/2014 | Kaneki | G02B 21/0092 |
| | | | 359/386 |
| 2017/0368638 A1* | 12/2017 | Tayebati | B23K 26/0626 |
| 2018/0260191 A1 | 9/2018 | Scarlett | |
| 2018/0284031 A1 | 10/2018 | Shoham et al. | |
| 2018/0364177 A1 | 12/2018 | Liu et al. | |
| 2024/0159520 A1* | 5/2024 | Honda | G01N 21/9501 |

OTHER PUBLICATIONS

U.S. Appl. No. 17/506,040 Notice of Allowance mailed Jun. 23, 2023, 12 pages.

* cited by examiner

177

178

OPTICAL INSPECTION USING CONTROLLED ILLUMINATION AND COLLECTION POLARIZATION

CROSS-REFERENCE TO RELATED APPLICATIONS

This application is a continuation-in-part of U.S. application Ser. No. 17/506,040, filed Oct. 20, 2021, the contents of which are incorporated herein by reference in their entirety for all purposes.

BACKGROUND

Samples such as semiconductor wafers are getting more complex and denser. In addition—microscopic structural elements of new shapes and materials emerge.

Inspecting such samples is getting harder and there is a growing need to provide an inspection system that can provide as much information about the inspected samples.

SUMMARY

There may be provided an optical inspection using controlled illumination and collection polarization.

There may be provided an optical inspection system that may include an illumination optics that is configured to generate an illumination light beam and to illuminate a sample with the illumination light beam; at least one collection optics configured to collect light from a sample as a result of an impingement of the illumination light beam on the sample; at least one detector configured to detect at least one detected light beam outputted from the at least one collection optics; multiple polarizers that are configured to (a) set a polarization of the illumination light beam by selectively introducing, under a control of a control unit, at least one illumination optics polarization change, and (b) set a polarization of the at least one detected light beam by selectively introducing, under a control of the control unit, at least one collection optics polarization change; and wherein the multiple polarizers may include an illumination half-wave plate, a first quarter-wave plate, a second half-wave plate, a second quarter-wave plate, and a first inhomogeneous polarizer.

There may be provided a method for inspecting a sample, the method may include determining polarizations of multiple polarizers of an optical inspection system; wherein the multiple polarizers may include a first half-wave plate, a first quarter-wave plate, a second half-wave plate, a second quarter-wave plate, and a first inhomogeneous polarizer; generating, by illumination optics, an illumination light beam; setting a polarization of the illumination light beam by selectively introducing at least one illumination optics polarization change, and illuminating the sample with the illumination light beam; collecting, by at least one collection optics, light from the sample, wherein the light resulted from the illuminating of the sample; setting a polarization of at least one detected light beam that is outputted from the at least one collection optics, by selectively introducing at least one collection optics polarization change; and detecting, by at least one detector, the at least one detected light beam.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIGS. 22-25 illustrate an example of an optical inspection system;
FIGS. 26-29 illustrate an example of an optical inspection system;
FIGS. 30-33 illustrate an example of an optical inspection system.

DETAILED DESCRIPTION

There may be provided an optical inspection using controlled illumination and collection polarization.

There may be provided an optical inspection system that may include (i) illumination optics that is configured to generate an illumination light beam and to illuminate a sample with the illumination light beam; (ii) at least one collection optics configured to collect light from a sample as a result of an impingement of the illumination light beam on the sample; (iii) at least one detector configured to detect at least one detected light beam outputted from the at least one collection optics; (iv) and multiple polarizers that are configured to (a) set a polarization of the illumination light beam by selectively introducing, under a control of the control unit, at least one illumination optics polarization change, and (b) set a polarization of at least one detected light beam by selectively introducing, under a control of the control unit, at least one collection optics polarization change. The multiple polarizers may include one of more half-wave plates, one or more quarter-wave plates and one or more inhomogeneous polarizers, that may be common or separate elements for the collection and illumination optical paths.

The optical inspection system may generate an illumination light beam and at least one detected light beam in multiple polarizations—by controlling the mentioned above multiple polarizers. For example—the system may exhibit control over polarization states in transverse-electric polarization (S-polarization) and transverse-magnetic polarization (P-polarization), and every combination of P-polarization and S-polarization—including radial polarization, tangential polarization, spiral polarization, and optical vortex polarization.

The polarization control may be applied by the illumination optics, and at least one collection optics, for reflection imaging modes, for scattering imaging modes, and up to entire filling of the numerical aperture (NA).

The polarization control can be used during a method that may adaptively adjust polarization parameters.

The optical inspection system can increase the signal to noise ratio (SNR) by enhancing the optical signal of defects and, additionally or alternatively, reducing wafer radiation noise.

Figure 1:
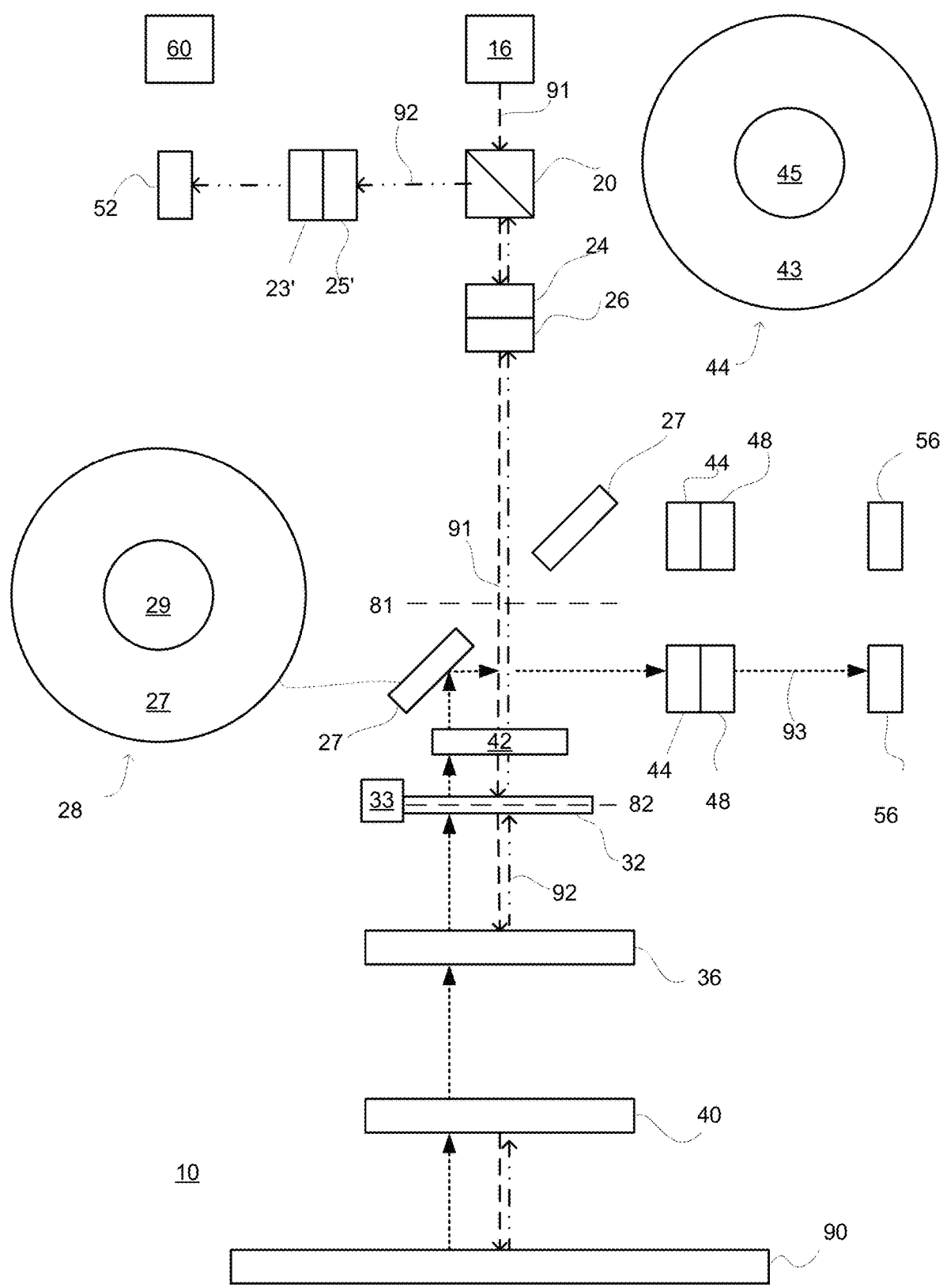
FIG. 1 is an example of an optical inspection system.
Figure 2:
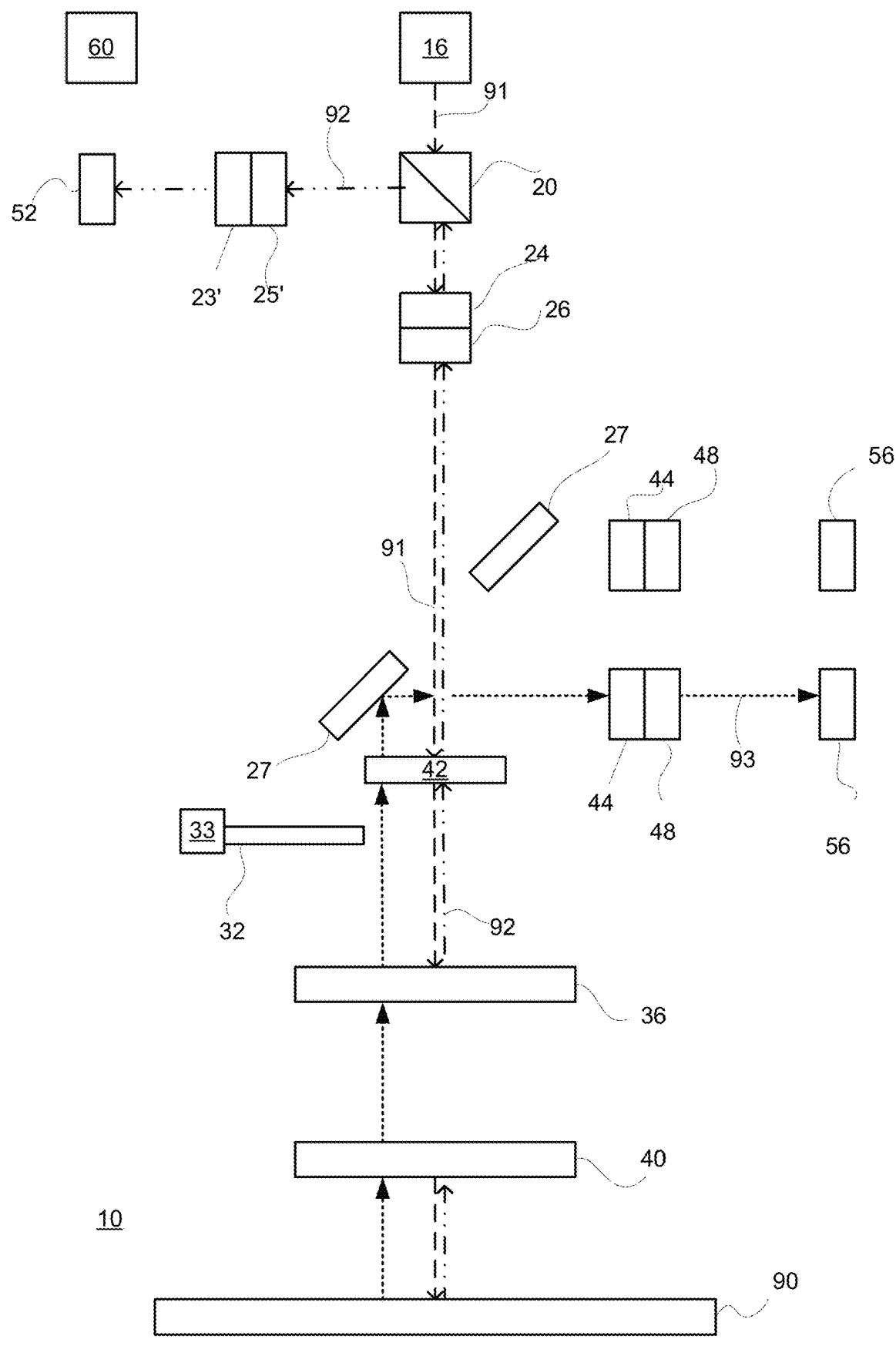
FIG. 2 is an example of an optical inspection system.
Figure 3:
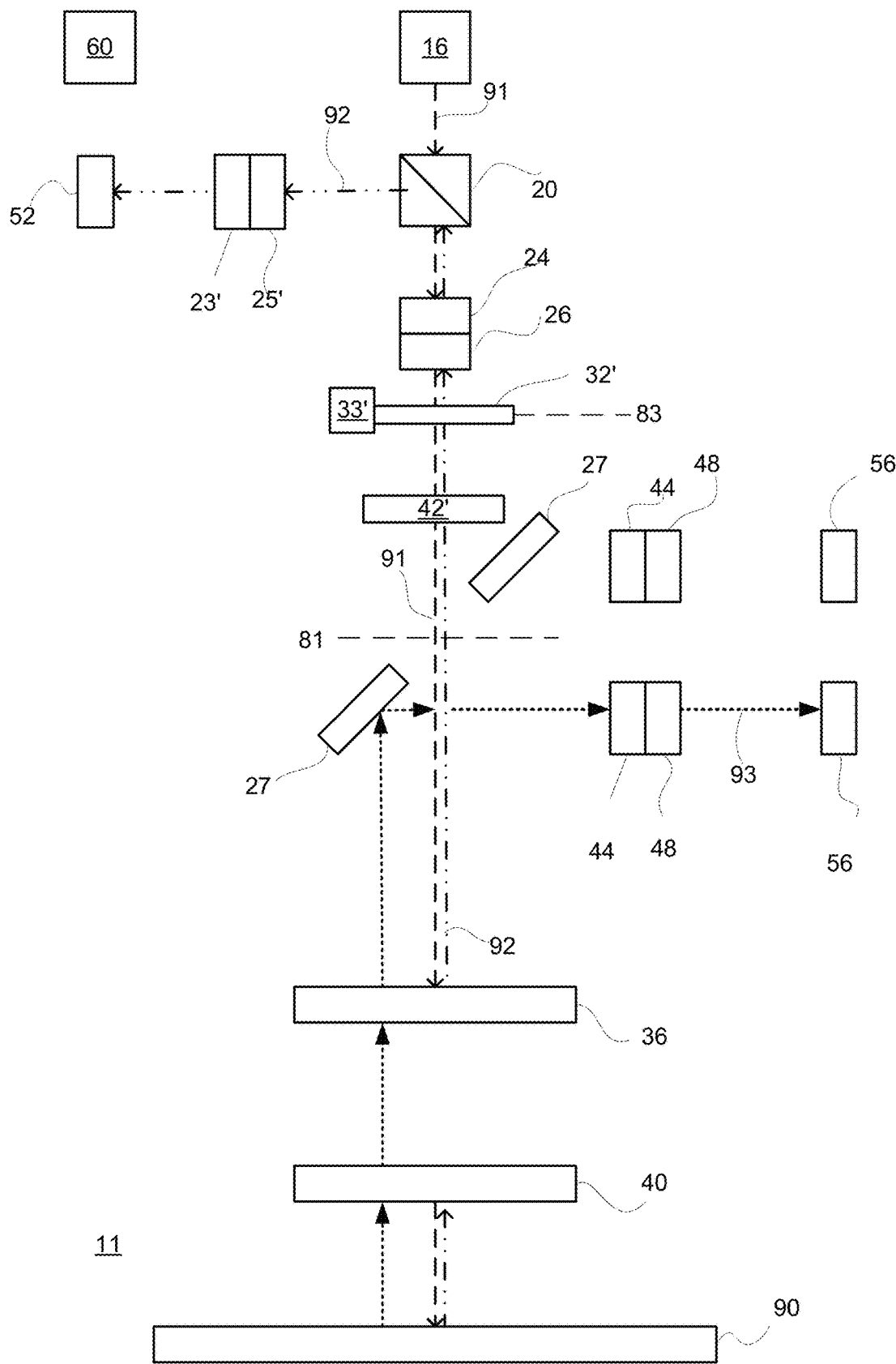
FIG. 3 is an example of an optical inspection system.

FIG. 1-3 illustrate an optical inspection system according to claim 10.

Optical inspection system includes controller and/or processor 60, and has illumination optics and collection optics that share one or more optical elements such as second beam splitter 28, telescope 36, and objective lens 40.

In FIG. 1 the illumination optics and the collection optics also share inhomogeneous polarizer (such as S-waveplate) 32 located at a second pupil plane 82, and a relay lens 42 positioned between a first pupil plane 81 and a second pupil plane 82. The first pupil plane 81 virtually crosses the center of the second beam splitter 28. The second beam splitter 28 may include, for example, a backside mirror of exterior part 27 (or another optically reflective element). Telescope 36 magnification together with the objective lens 40 defines the NA areas of aperture 29 and backside mirror of exterior part 27 in the aperture plane.

In FIG. 1 the illumination optics includes light source 16, first beam splitter 20, first half-wave plate 24, first quarter-wave plate 26, second beam splitter 28, relay lens 42, S-waveplate 32, telescope 36 and objective lens 40.

The S-waveplate 32 is movable by first movement unit 33.

The first movement unit 33 is configured to move the S-waveplate 32 between a first position in which the S-waveplate 32 is positioned within the path of the illumination light beam and a second position in which the S-waveplate 32 is located outside the path of the illumination light beam.

In FIG. 1 the illumination beam 91 is outputted by light source 16, passes through first beam splitter 20, may have its polarization set by at least one of first half-wave plate 24 and first quarter-wave plate 26, passes through central aperture 29 of the second beam splitter 28, has its polarization changed by S-waveplate 32, and be directed towards sample 90 and be focused onto sample 90 by telescope 36 and objective lens 40.

In FIG. 1, at least one collection optics includes objective lens 40, telescope 36, S-waveplate 32, relay lens 42, second beam splitter 28, first half-wave plate 24, first quarter-wave plate 26, and first beam splitter 20, third half-wave plate 25', and third quarter-wave plate 23'.

In FIG. 1, reflected beam 92 passes through objective lens 40, telescope 36, has its polarization changed by the S-waveplate 32, passes through relay lens 42, central aperture 29 of the second beam splitter 28, may have its polarization set by at least one of first half-wave plate 24 and first quarter-wave plate 26, and is directed, by first beam splitter 20, may have its polarization changed by third half-wave plate 25' and third quarter-wave plate 23', and may reach first detector 52 or any first detection optics that ends by the first detector 52.

In FIG. 1, scattered beam 93 passes through objective lens 40, telescope 36, has its polarization changed by the S-waveplate 32, passes through relay lens 42, impinges on a backside mirror of exterior part 27 of the second beam splitter 28 and is directed towards second half-wave plate 44 and second quarter-wave plate 48, may have its polarization set by at least one of second half-wave plate 44 and second quarter-wave plate 48, and is directed to second detector 56 or any second detection optics that ends by the second detector 56. Second half-wave plate 44 includes second aperture 45 and second exterior part 43.

It should be noted that reflected beam 92 and scattered beam 93 are named based on assumption that the illumination of the sample is as illustrated in FIG. 1. Other illumination schemes may result in having a reflected beam pass through the path of what is referred to as reflected beam 92 of FIG. 1 and have a scattered beam pass through the path of what is referred to as scattered beam 93. It should be noted that the optical inspection system may have other illumination paths—for example illumination paths that illuminate the sample at angles that differ from ninety degrees.

In FIG. 1, for simplicity of explanation, beam 92 was illustrated as propagating to the side of beam 91—but both beams (at least between the object and the first beam splitter) may be coaxial.

FIG. 2 illustrates an example of an optical inspection system in which the S-waveplate is located outside the path of the illumination beam and outside the path of the reflected beam.

FIG. 3 illustrates an example of optical inspection system 11 that includes another inhomogeneous polarizer (such as other S-waveplate 32') that is located at a third pupil plane 83 that differs from the second pupil plane—for example is located upstream to the second beam splitter. The other S-waveplate 32' can be moved by second movement unit 33'.

The second movement unit 33' is configured to move the other S-waveplate 32' between a third position in which the other S-waveplate 32' is positioned within the path of the illumination light beam and a fourth position in which the other S-waveplate 32' is located outside the path of the illumination light beam.

Any movement of any inhomogeneous polarizer may be of any type—linear, rotational, and the like.

FIG. 3 also illustrates another relay lens 42' positioned between the other S-waveplate 32' and the first pupil plane 81.

Figure 4:
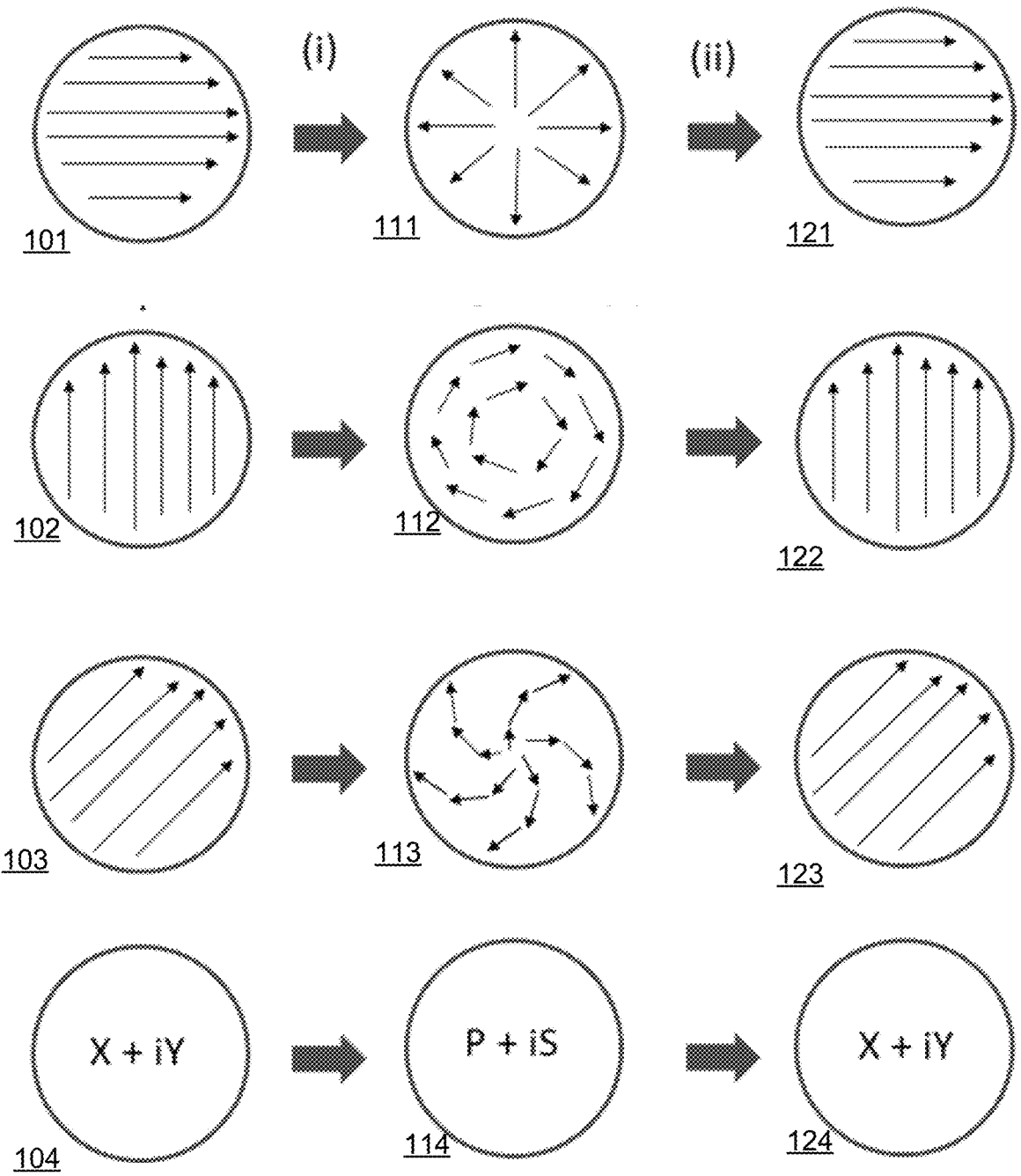
FIG. 4 illustrates examples of polarization modes.

FIG. 4 illustrates examples of light polarization after single or double pass through an S-waveplate.

A single pass of linear (x-axis) polarization 101 through the S-waveplate provides a radial (P) polarization 111, while a double pass provide the original (linear x-axis) polarization 121.

A single pass of linear (y-axis) polarization 102 through the S-waveplate provides a tangential (S) polarization 112, while a double pass provide the original (linear Y-axis) polarization 122.

A single pass of linear (diagonal) polarization 103 through the S-waveplate provides a spiral polarization 113, while a double pass provide the original (linear diagonal) polarization 123.

A single pass of circular (X+iY) polarization 104 through the S-waveplate provides an optical vortex polarization 114, while a double pass provide the original (circular) polarization 124.

Figure 5:
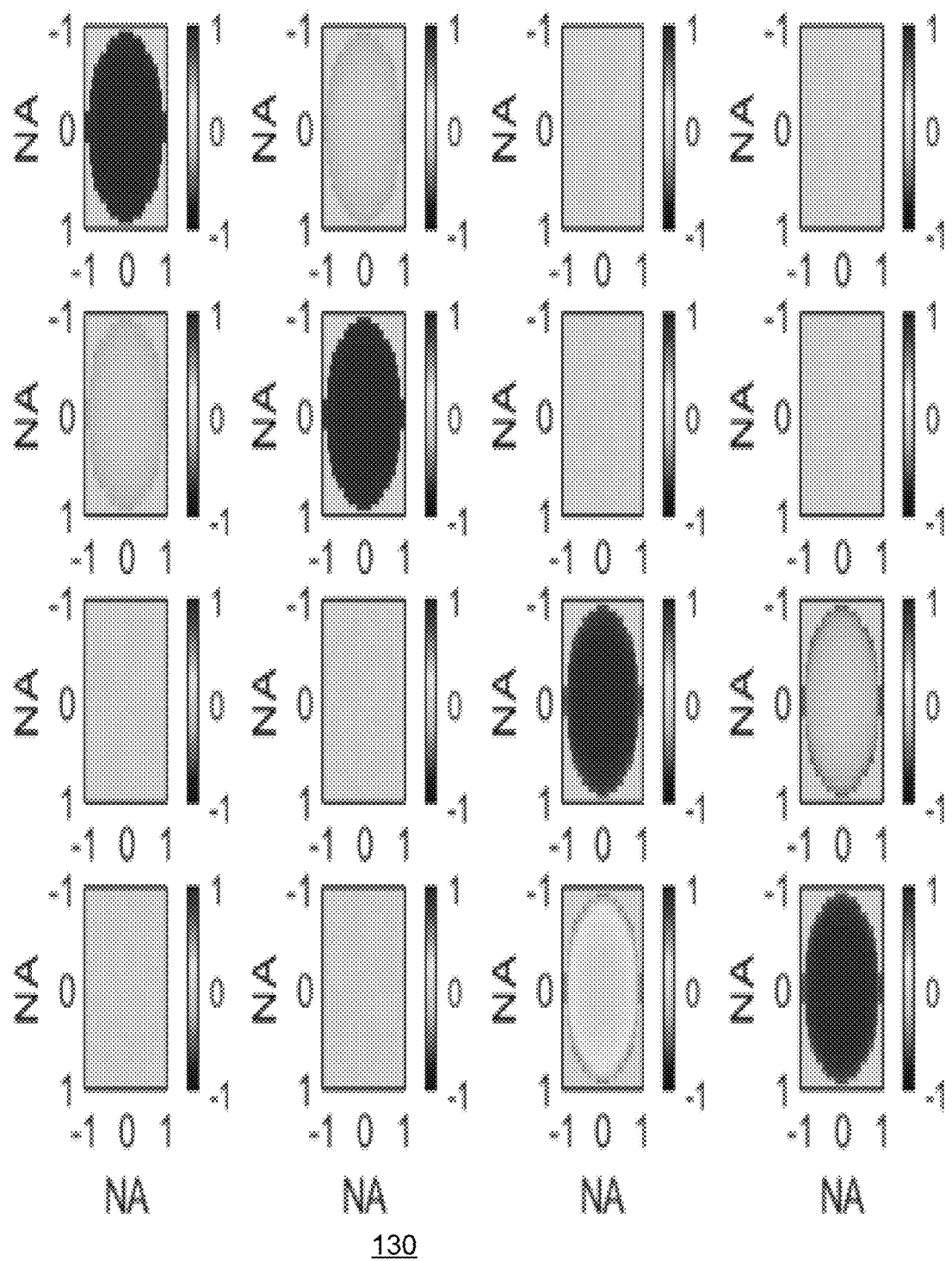
FIGS. 5 and 6 illustrate examples of Mueller matrix polarimetry.

FIG. 5 illustrates an example of Mueller matrix polarimetry of Silicon substrate reflection in S—P base—as can be seen in the sixteen different images collectively denoted 130. FIG. 5 illustrates that the S—P is the natural polarization base for flat wafer geometry.

Figure 6:
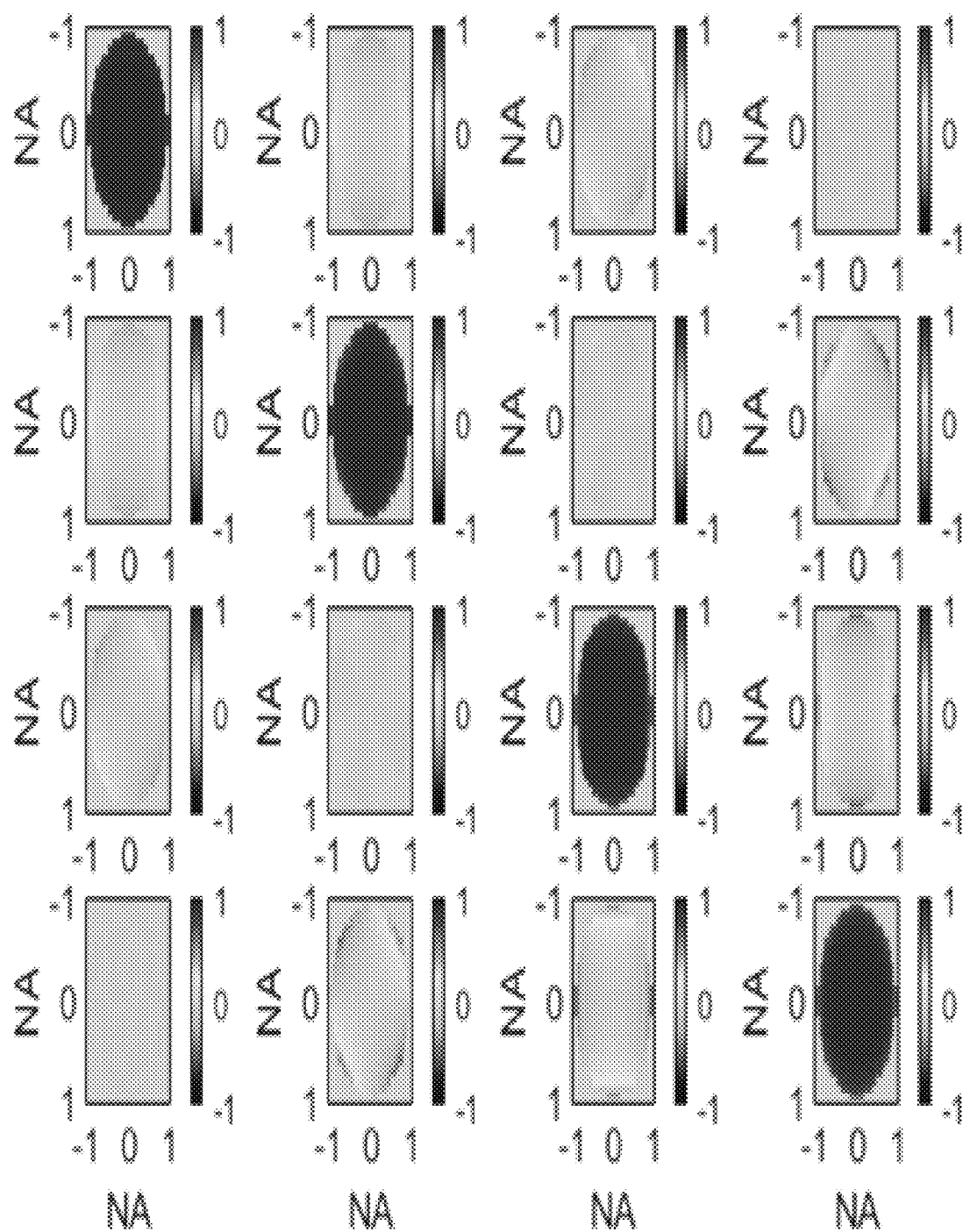

FIG. 6 illustrates an example of Mueller matrix polarimetry of Silicon substrate reflection in linear polarization base—as can be seen in the sixteen different images collectively denoted 132.

Figure 7:
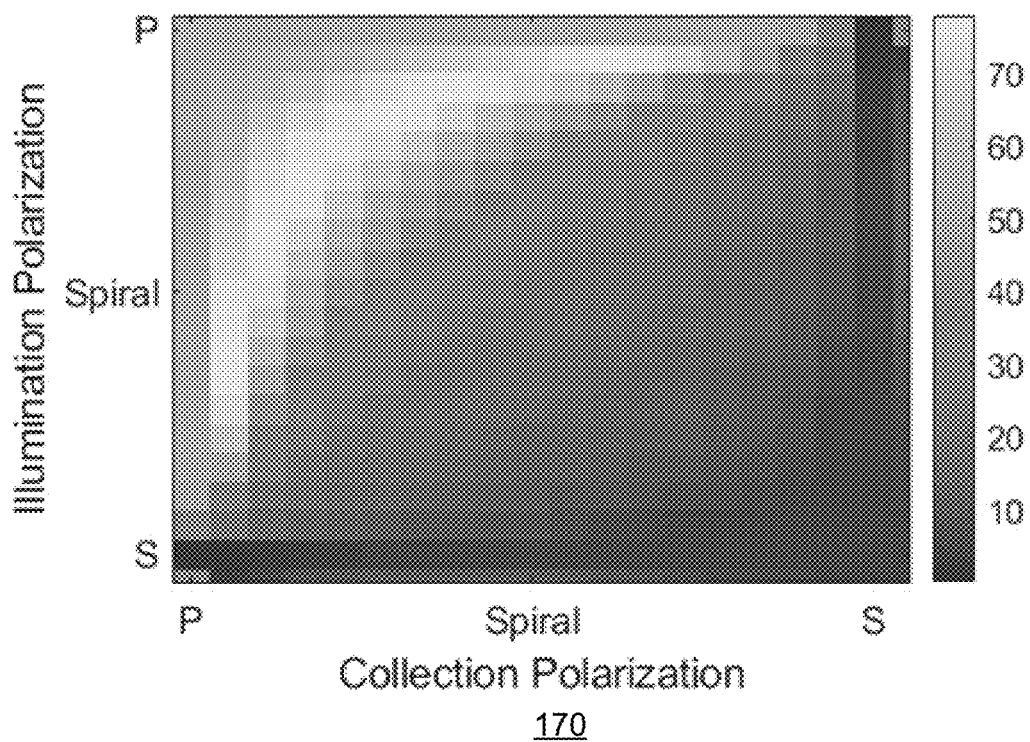
FIGS. 7 and 8 illustrate examples of various detected signal attributes.

FIG. 7 illustrates an example of an SNR map 170 in S—P base, for Si particle on a rough Si surface using reflection collection channel. This is an example where max SNR is found at a polarization configuration not on the S—P main axes.

This figure demonstrates the need for a system that can span the entire S—P base to find the max SNR.

Figure 8:
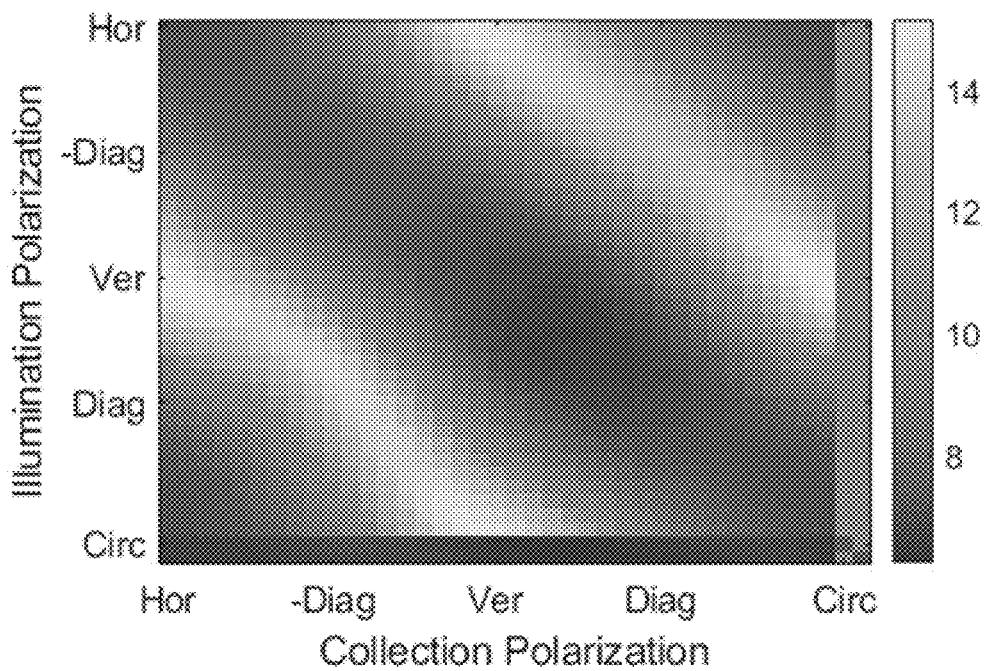
Figure 8:
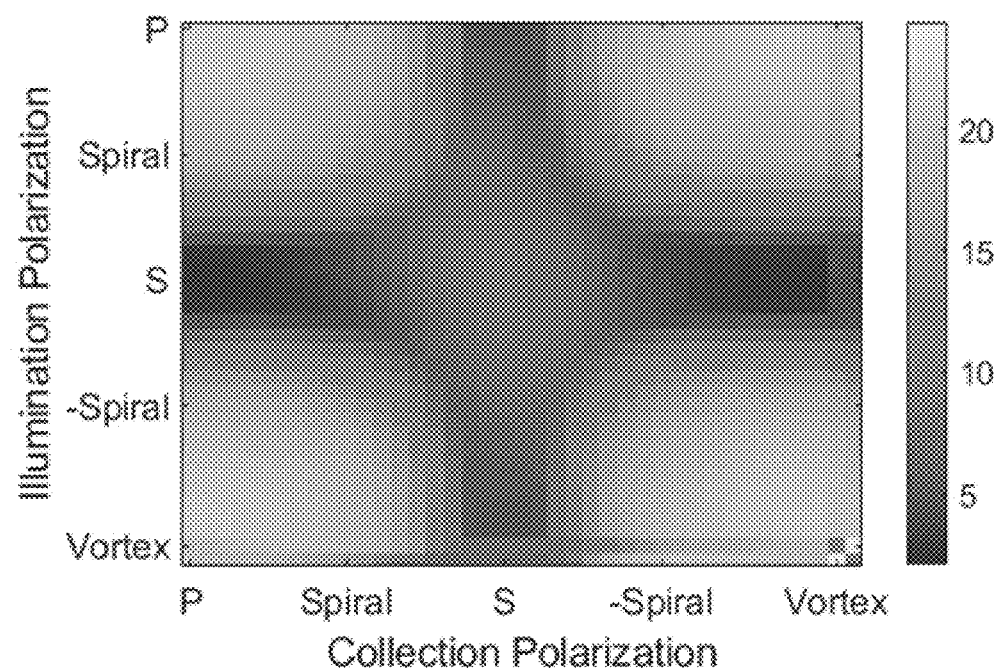

In FIG. 8 illustrates SNR maps 177 and 178 for Si particle on a rough Si surface using scattering collection channel.

Each point on the map is the calculated SNR for a given illumination polarization and collection polarization.

Top: linear polarization base. Bottom: S—P polarization base. The SNR maps are based on full electro-magnetic finite-difference time domain (FDTD) simulations in S-matrix approach.

Compared to a linear polarization-based microscope, in S—P polarization base, the max SNR is much higher and is found at a stable, non-orthogonal illumination and collection polarizations.

An optical inspection system may include more than a single inhomogeneous polarizer. For example—one shared by the illumination optics and a collection optics (see for example S-waveplate 32) and another may be allocated to a scattering collection channel (for example—having the S-waveplate located in another pupil plane between beam splitter 28 and second half-wave plate 44.

Figure 9:
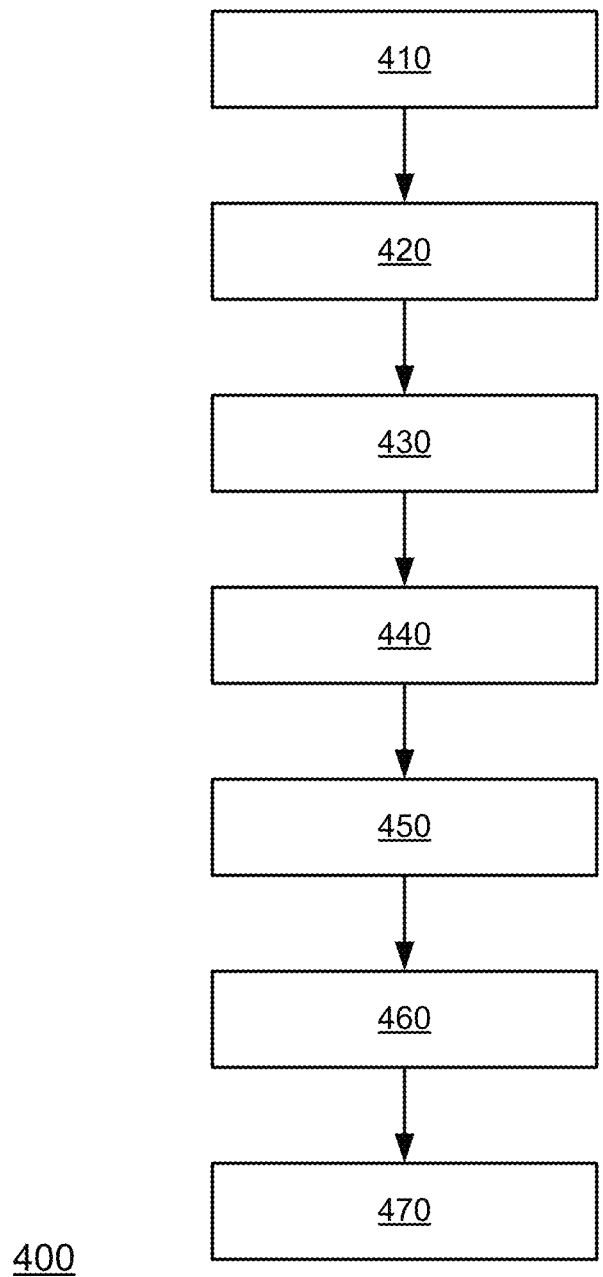
FIG. 9 is an example of a method.

FIG. 9 is an example of method 400.

Method 400 is for illuminating a sample and detecting light from the sample.

Method 400 may start by step 410 of determining polarizations of multiple polarizers of an optical inspection system; wherein the multiple polarizers comprise a first half-wave plate, a first quarter-wave plate, a second half-wave plate, a second quarter-wave plate, and a first inhomogeneous polarizer.

Step 410 may be followed by step 420 of generating, by illumination optics, an illumination light beam.

Step 420 may be followed by step 430 of setting a polarization of the illumination light beam by selectively introducing at least one illumination optics polarization change, and illuminating a sample with the illumination light beam.

Step 430 may be followed by step 440 of collecting, by at least one collection optics, light from the sample, wherein the light resulted from the illuminating of the sample.

Step 440 may be followed by step 450 of setting a polarization of at least one detected light beam that is outputted from the at least one collection optics, by selectively introducing at least one collection optics polarization change.

Step 450 may be followed by step 460 of detecting, by at least one detector, the at least one detected light beam.

The collection optics may include a bright field (BF) collection optics (such as the first detection optics of FIG. 1) and/or a dark field (DF) collection optics (such as the second detection optics of FIG. 1). The BF collection optics receives the reflected light while the DF collection optics receives the scattered light.

In FIG. 1 the BF collection includes objective lens 40, telescope 36, S-waveplate 32, relay lens 42, second beam splitter 28, first half-wave plate 24, first quarter-wave plate 26, first beam splitter 20, third half-wave plate 25', third quarter-wave plate 23', and first detector 52. Other optical components may belong to the BF collection optics.

In FIG. 1 the DF collection includes objective lens 40, telescope 36, S-waveplate 32, relay lens 42, second beam splitter 28, second half-wave plate 44, second quarter-wave plate 48, second half-wave plate 44, second quarter-wave plate 48, and second detector 56. Other optical components may belong to the DF collection optics.

Figure 10:
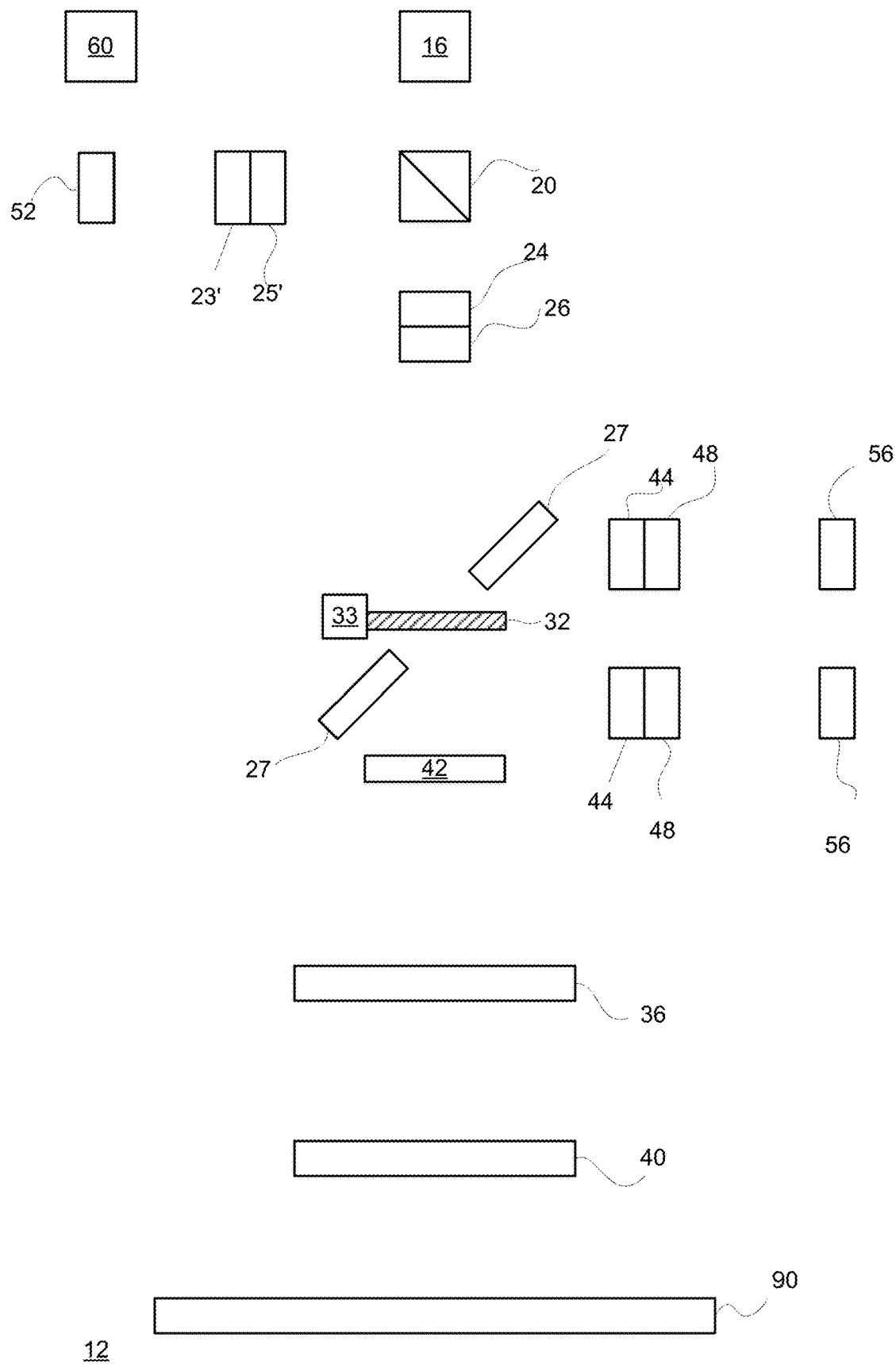
FIGS. 10 and 11 illustrate an example of an optical inspection system.
Figure 11:
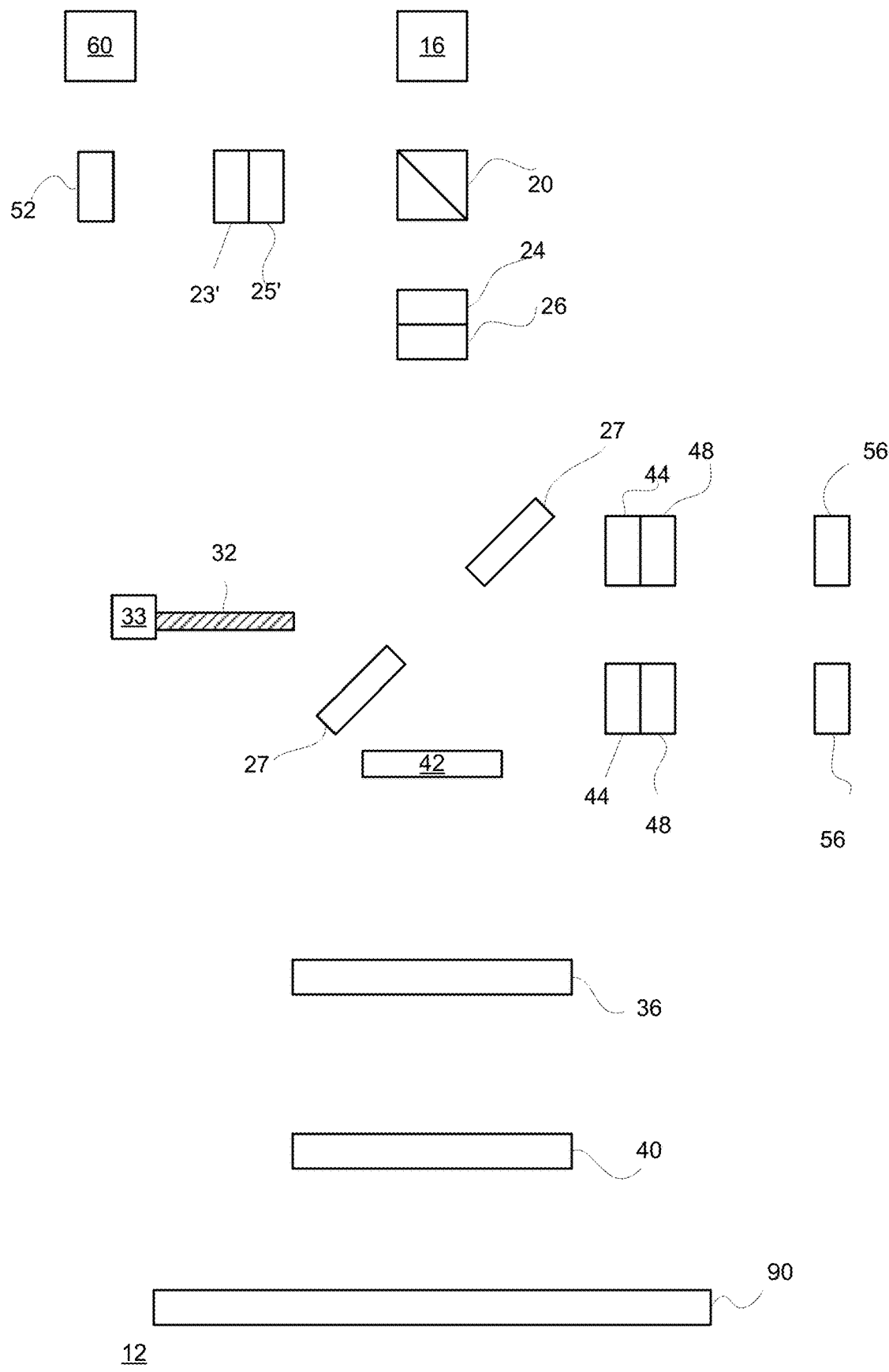
Figure 12:
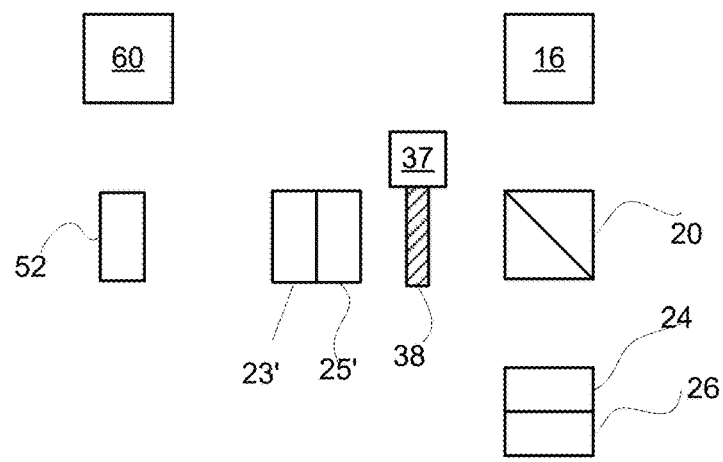
FIGS. 12-15 illustrate an example of an optical inspection system.
Figure 12:
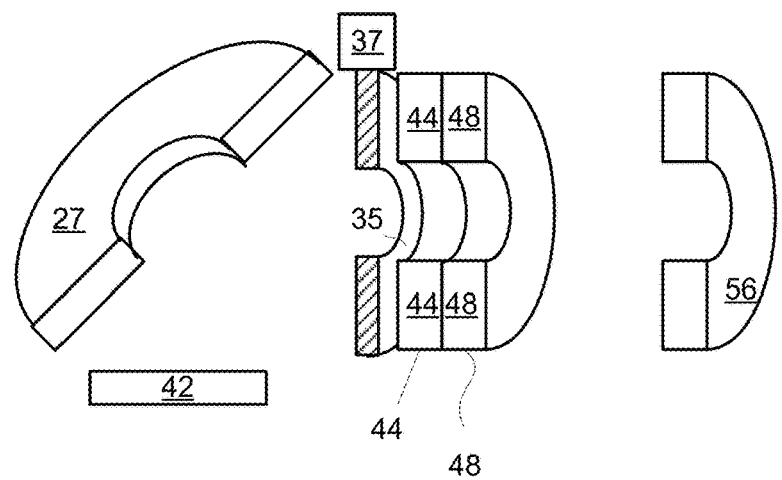
Figure 12:
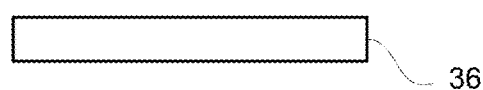
Figure 12:
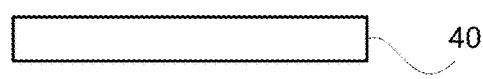
Figure 12:
Figure 13:
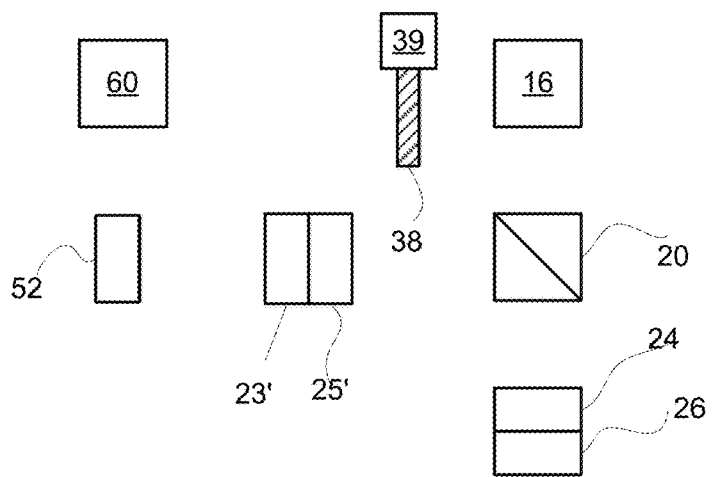
Figure 13:
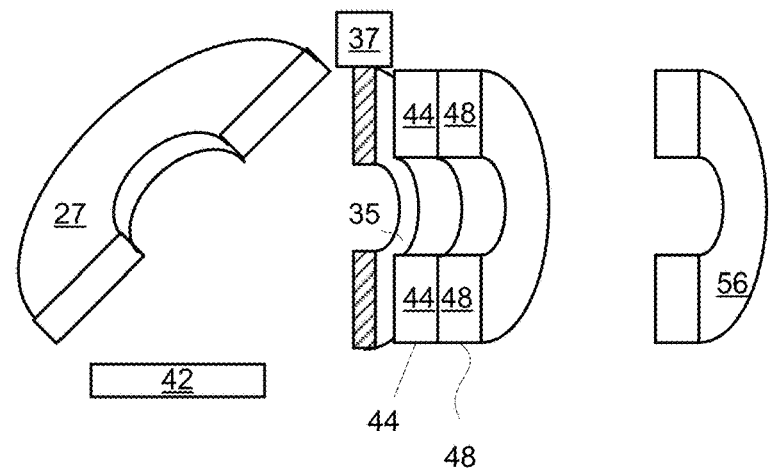
Figure 13:
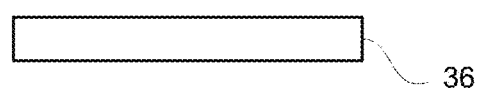
Figure 13:
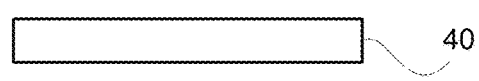
Figure 13:
Figure 14:
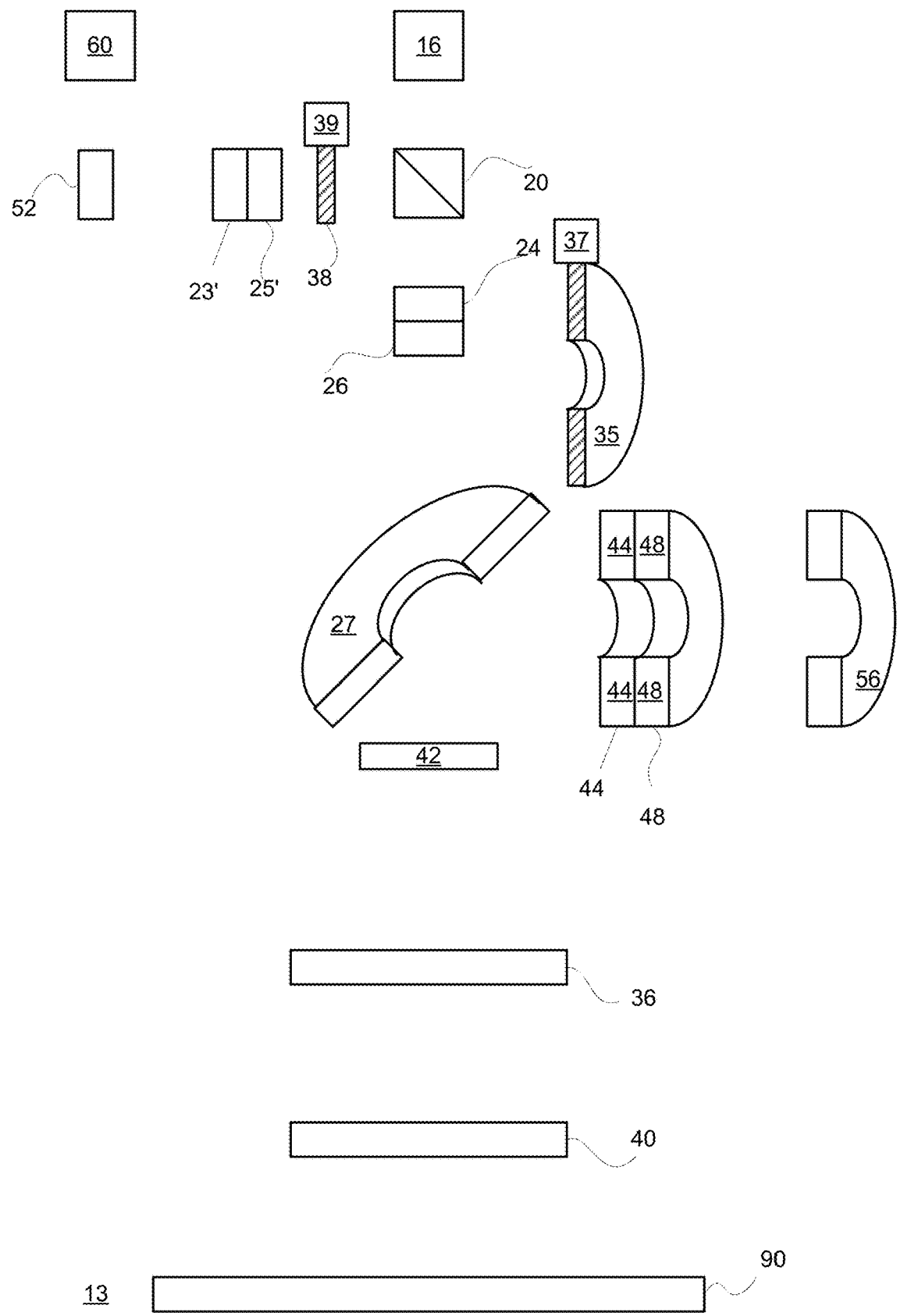
Figure 15:
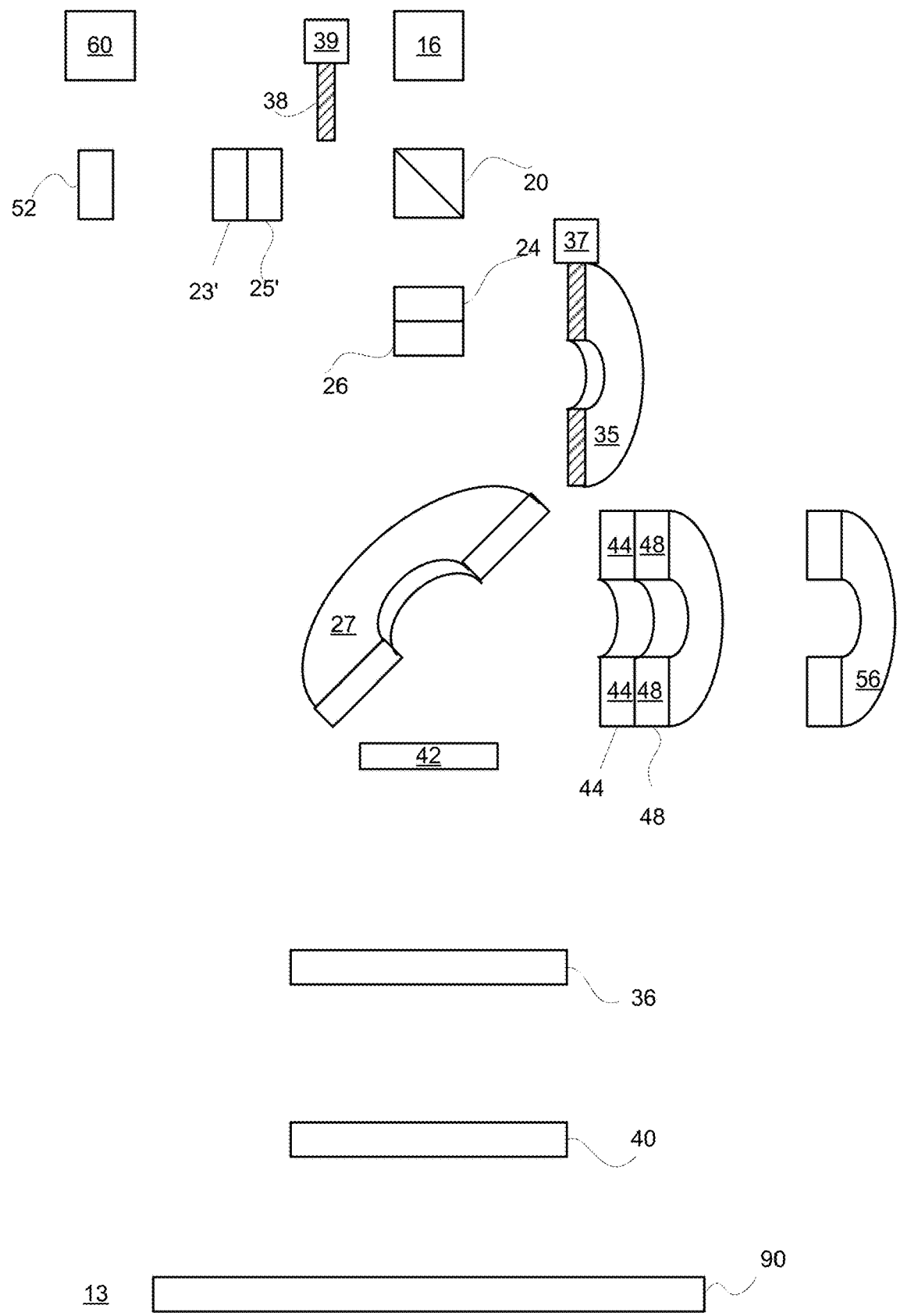

FIGS. 10 and 11 illustrates an example of an optical inspection system 12 according to an embodiment. Optical inspection system 12 differs from optical system 10 of FIG. 1 by positioning the first inhomogeneous polarizer (such as S-waveplate 32) at the first pupil plane instead at the second pupil plane. Relay lens 42 is positioned between a first pupil plane and a second pupil plane. The first inhomogeneous polarizer is movable by first movement unit 33. The first movement unit 33 is configured to move the first inhomogeneous polarizer between a polarization-impacting position (see FIG. 10) in which the polarization (of the illumination light beam and both detected light beams) is impacted by and a polarization-irrelevant position (see FIG. 11) in which the polarization is not impacted.

FIGS. 12-15 illustrate an example of optical inspection system 13 according to an embodiment.
Optical Inspection System 13 Differs from Optical System 10 of FIG. 1 by:
  Lacking a inhomogeneous polarizer in the illumination path.
  Having a DF inhomogeneous polarizer 35 (movable by DF movement unit 37) positioned between the first beam splitter 20 and the third half-wave plate 25'. DF movement unit 37 is configured to move the DF inhomogeneous polarizer 35 between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer.
  Having a BF inhomogeneous polarizer 38 (movable by BF movement unit 39) positioned between the second beam splitter 28 and second half-wave plate 44. BF movement unit 39 is configured to move the BF inhomogeneous polarizer 38 between a polarization-impacting position in which a polarization of the BF detected light beam is impacted by the BF inhomogeneous polarizer and a polarization-irrelevant position in which the polarization of the BF detected light beam is not impacted by the by the BF inhomogeneous polarizer.

FIGS. 12-15 differ from each other by the positions of the BF inhomogeneous polarizer 38 and of the DF inhomogeneous polarizer 35.

Figure 16:
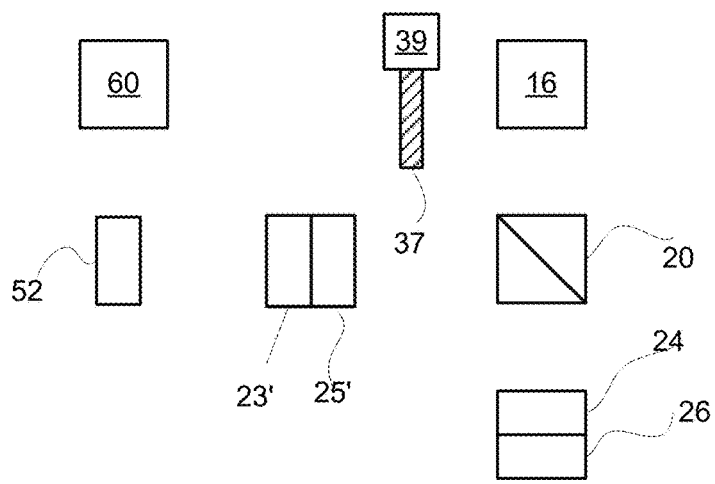
FIGS. 16-17 illustrate an example of an optical inspection system.
Figure 16:
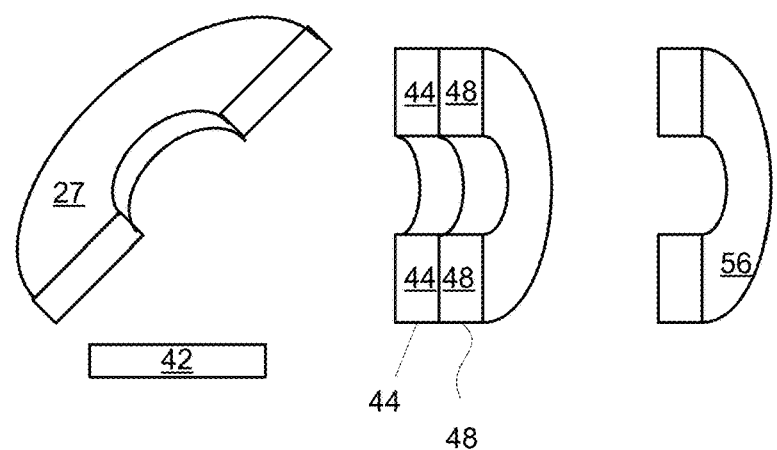
Figure 16:
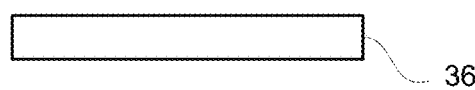
Figure 16:
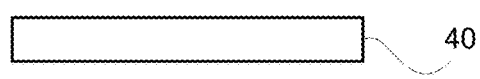
Figure 16:
Figure 17:
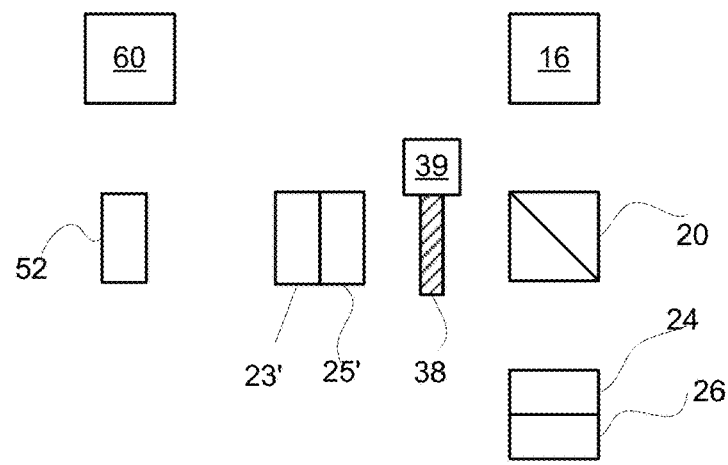
Figure 17:
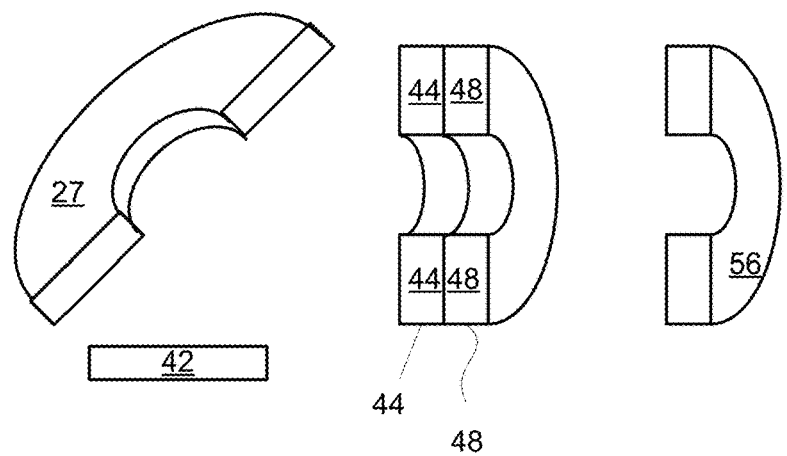
Figure 17:
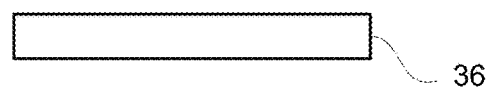
Figure 17:
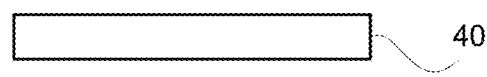
Figure 17:

FIGS. 16-17 illustrate an example of optical inspection system 14 according to an embodiment.

Optical inspection system 14 differs from optical system 10 of FIG. 1 by:
  Lacking a inhomogeneous polarizer in the illumination path.
  Having a BF inhomogeneous polarizer 38 (movable by BF movement unit 39) positioned between the second beam splitter 28 and second half-wave plate 44. BF movement unit 39 is configured to move the BF inhomogeneous polarizer 38 a polarization-impacting position in which a polarization of the BF detected light beam is impacted by the BF inhomogeneous polarizer and a polarization-irrelevant position in which the polarization of the BF detected light beam is not impacted by the by the BF inhomogeneous polarizer.

Figure 18:
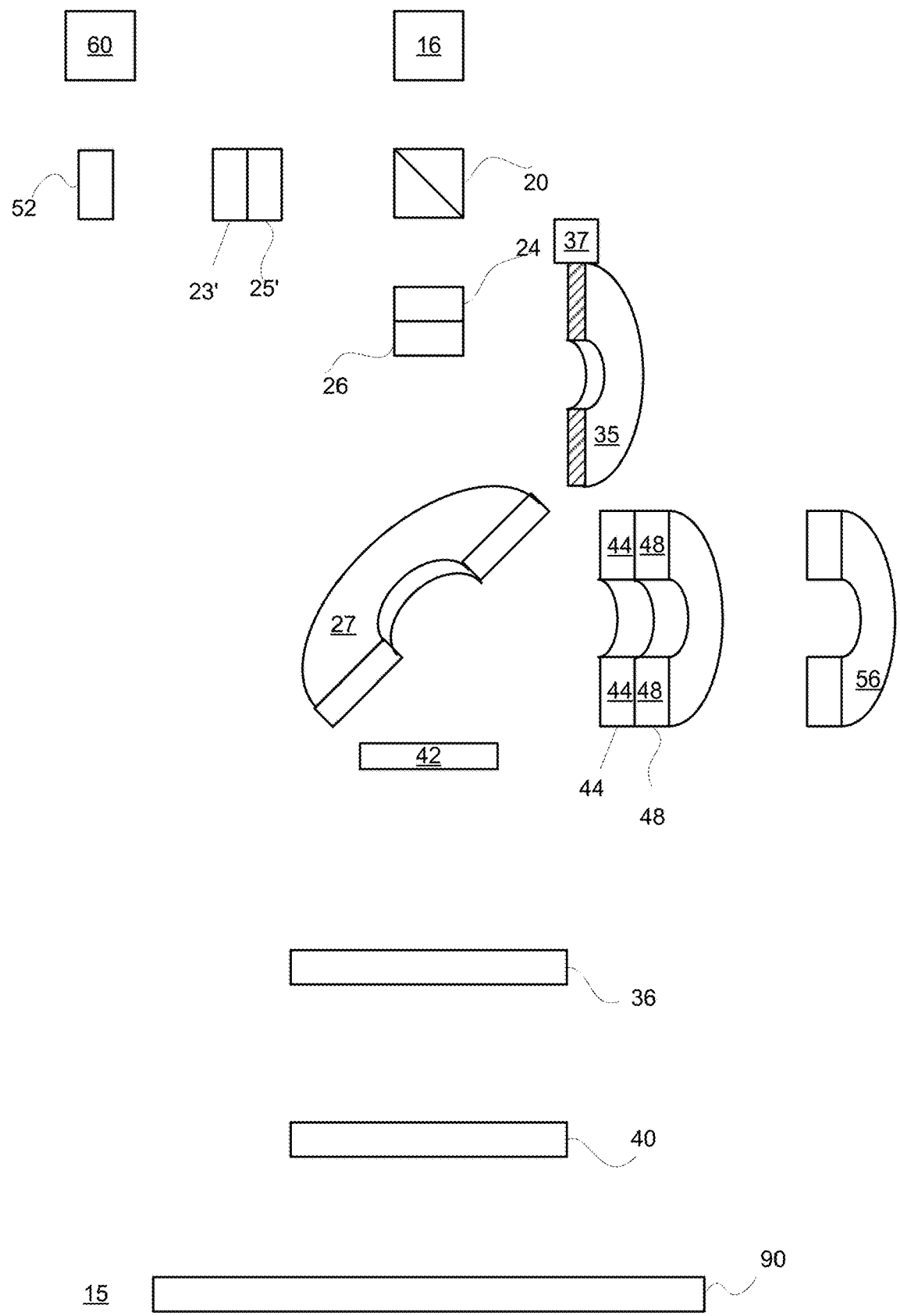
FIGS. 18-19 illustrate an example of an optical inspection system.
Figure 19:
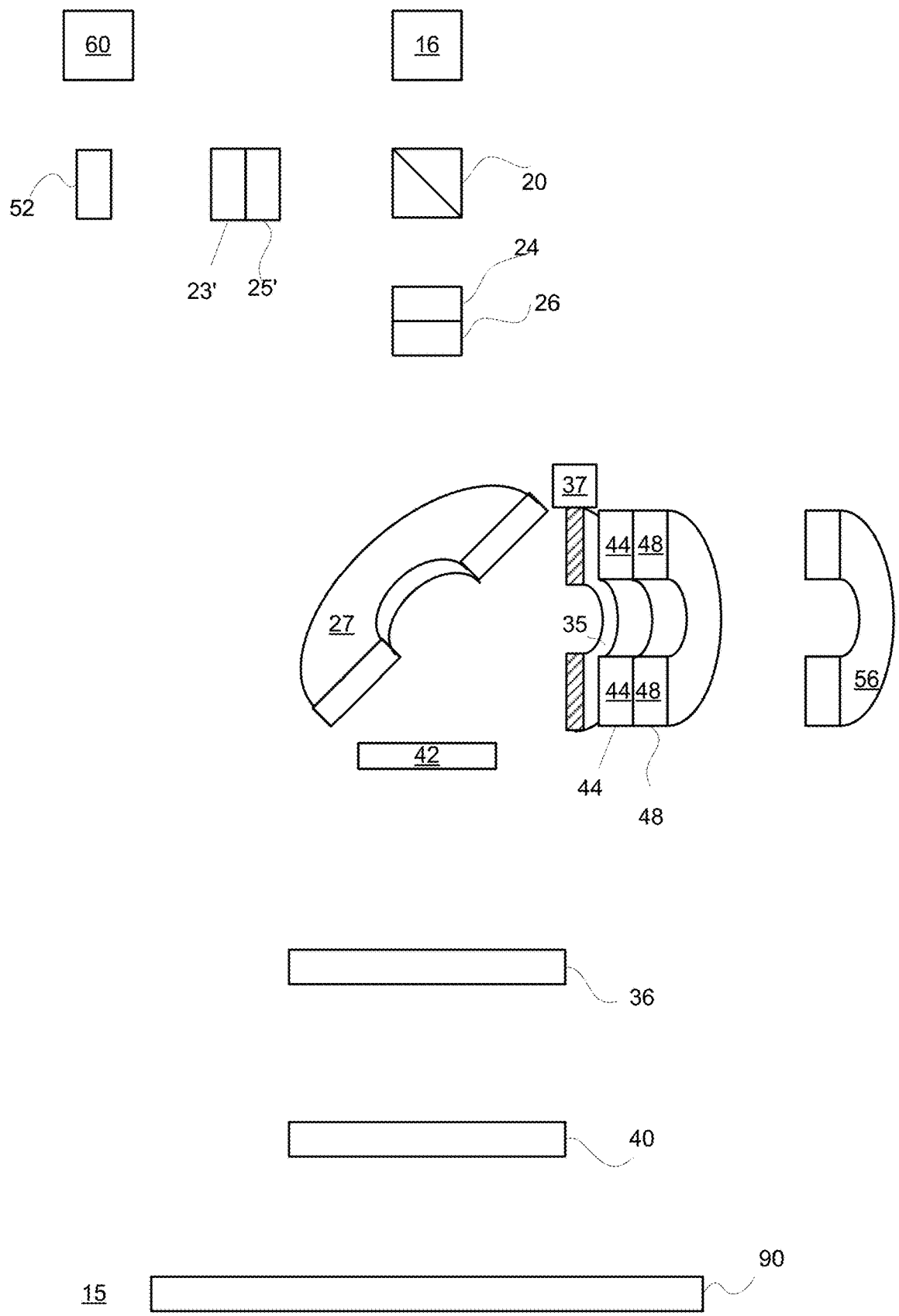

FIGS. 18-19 illustrate an example of optical inspection system 15 according to an embodiment.

Optical Inspection System 15 Differs from Optical System 10 of FIG. 1 by:
 Lacking a inhomogeneous polarizer in the illumination path.
 Having a DF inhomogeneous polarizer 35 (movable by DF movement unit 37) positioned between the first beam splitter 20 and the third half-wave plate 25'. DF movement unit 37 is configured to move the DF inhomogeneous polarizer 35 between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer.

Figure 20:
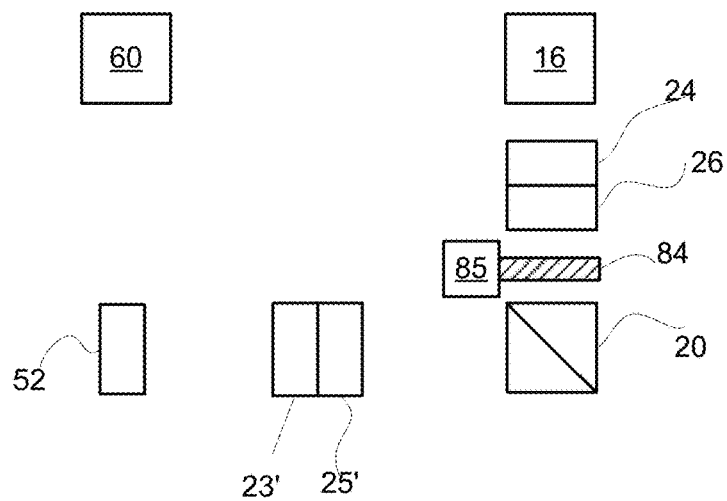
FIGS. 20-31 illustrate an example of an optical inspection system.
Figure 20:
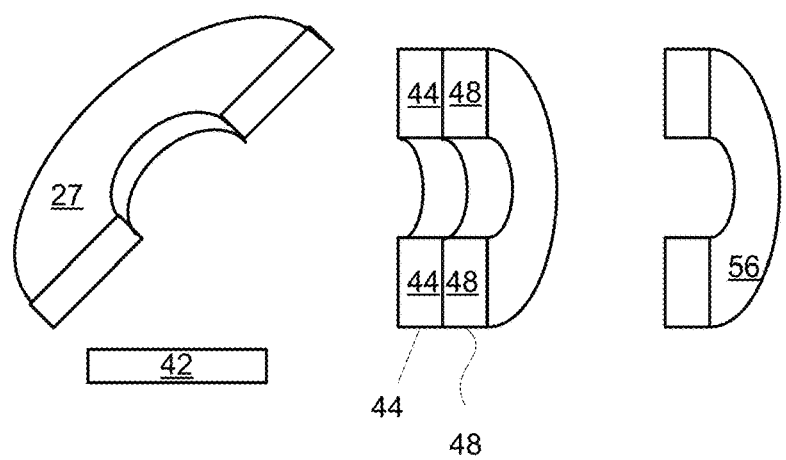
Figure 21:
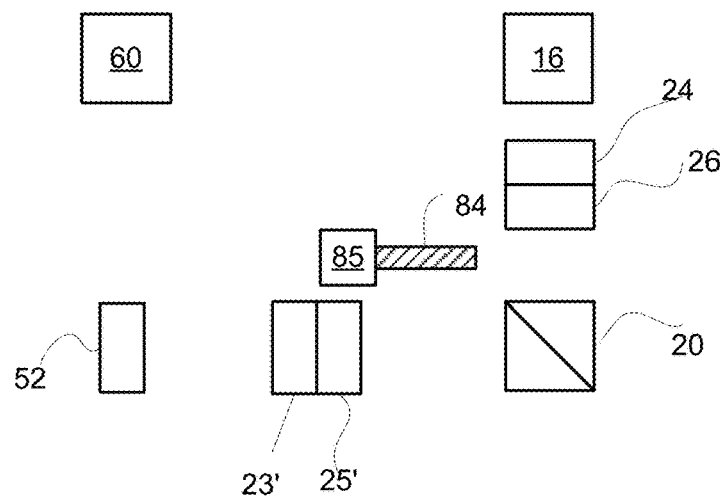
Figure 21:
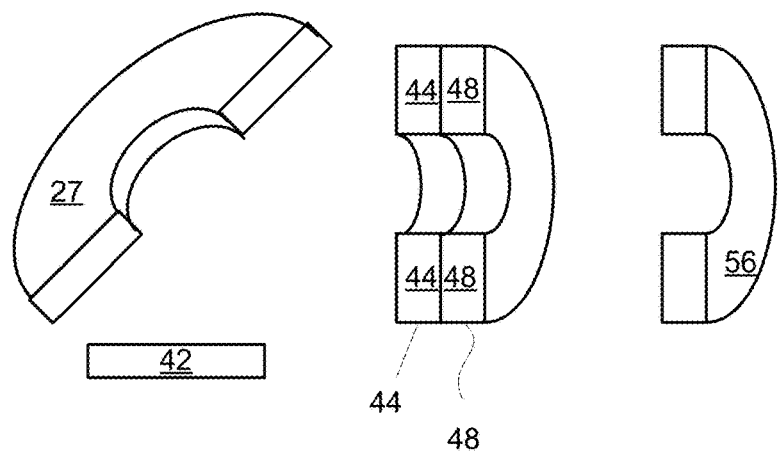
Figure 21:
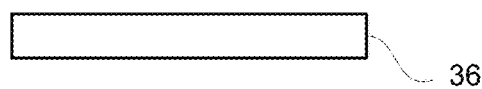
Figure 21:
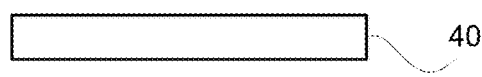
Figure 21:
Figure 22:
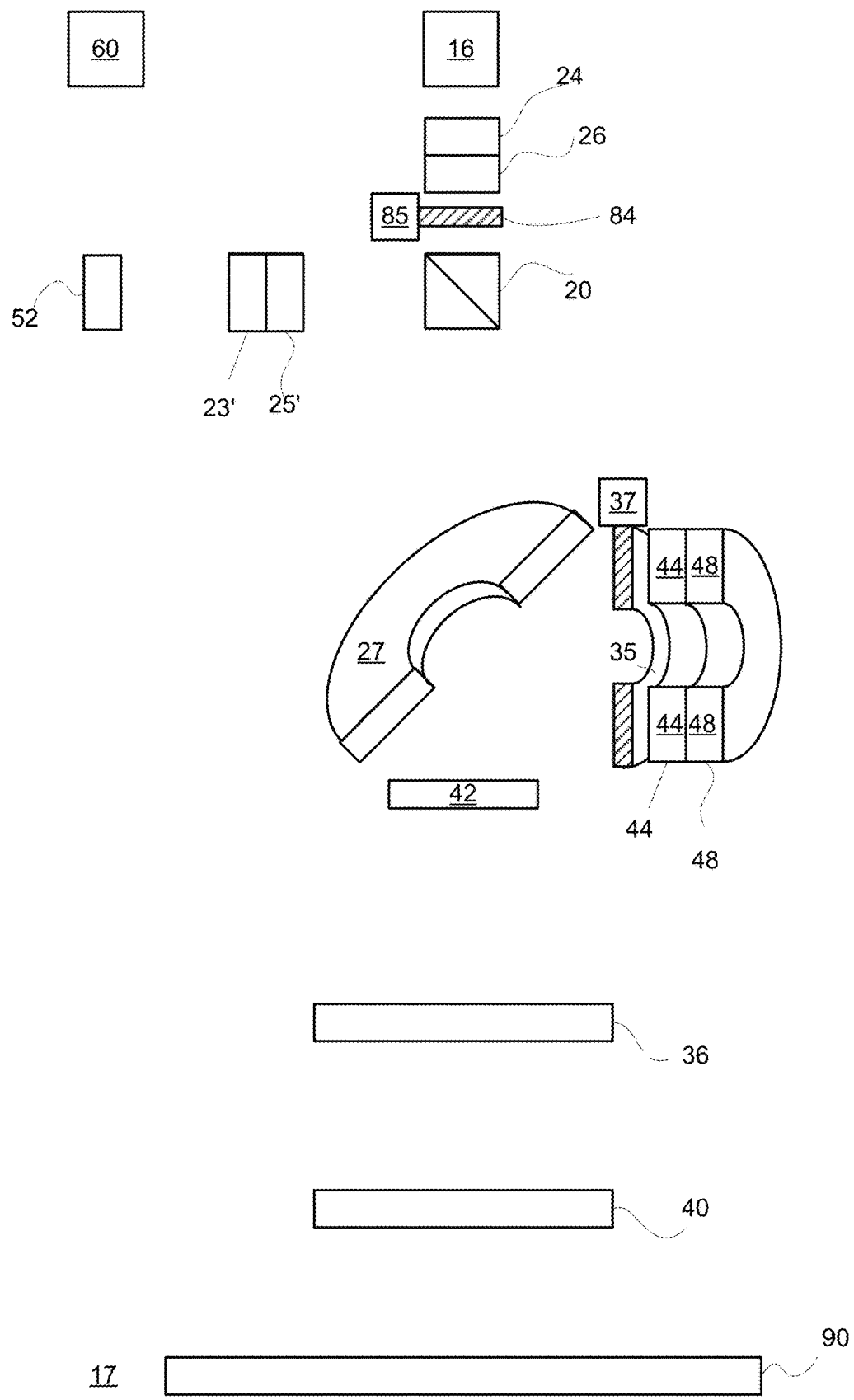
Figure 23:
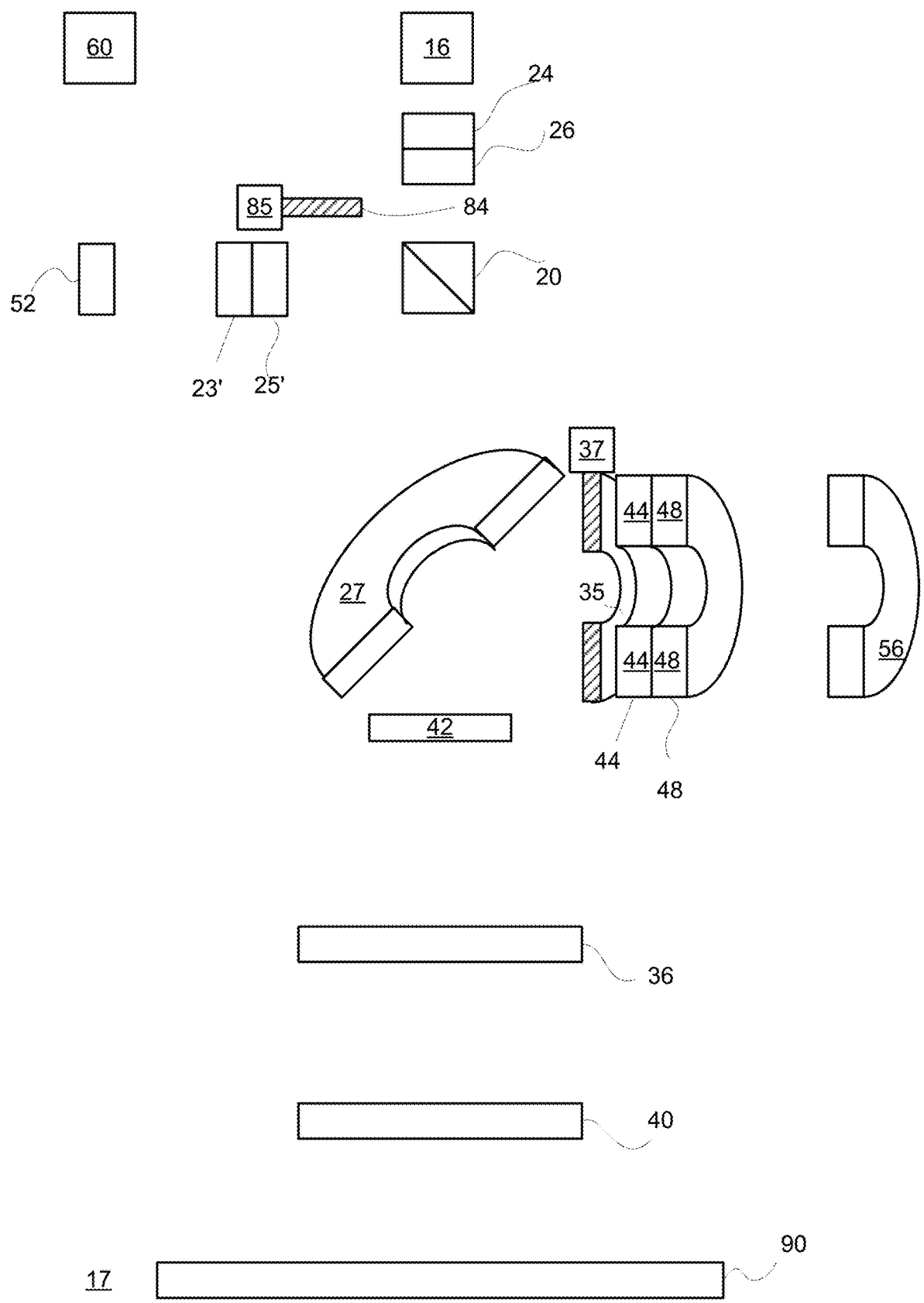
Figure 24:
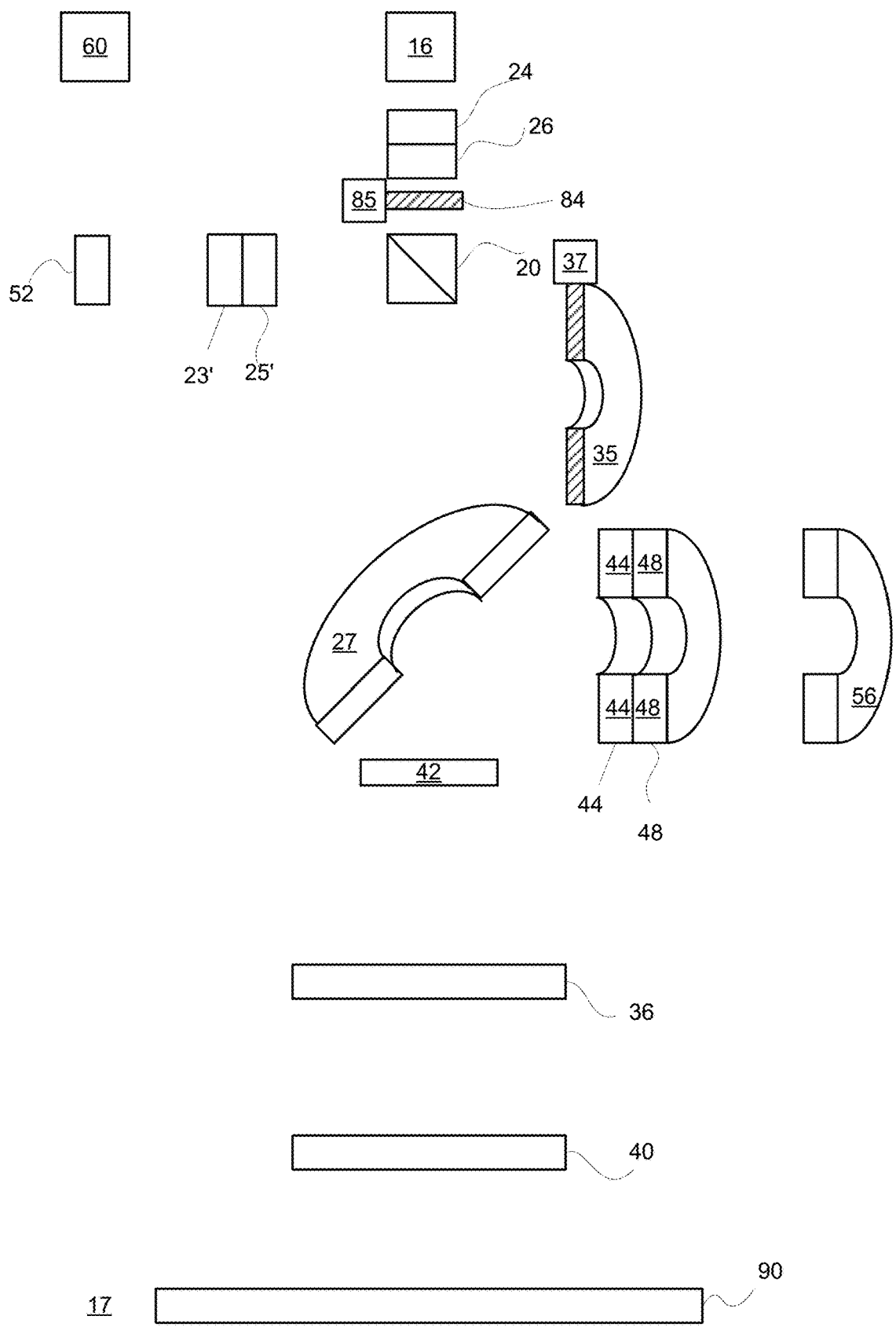
Figure 25:
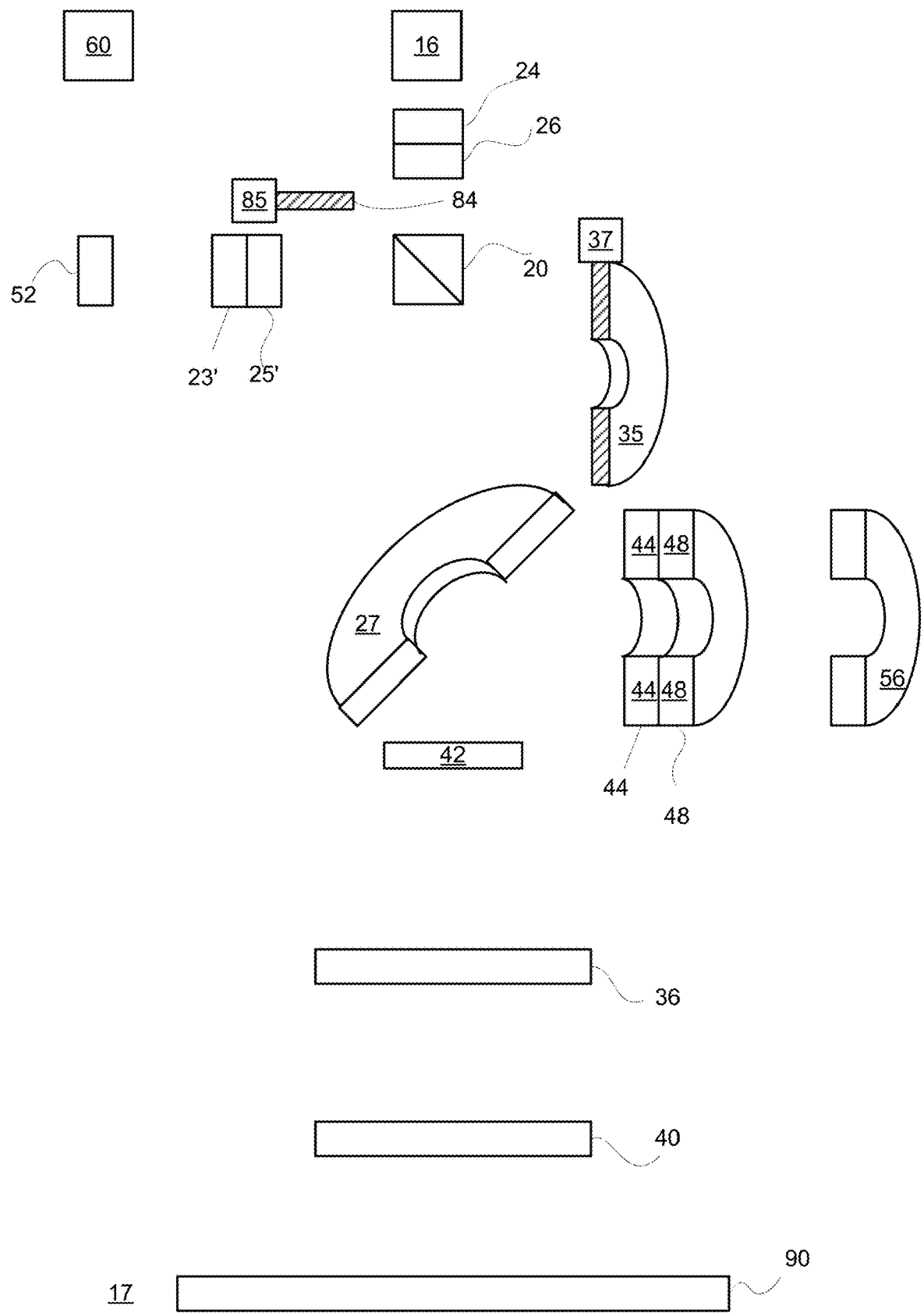
Figure 26:
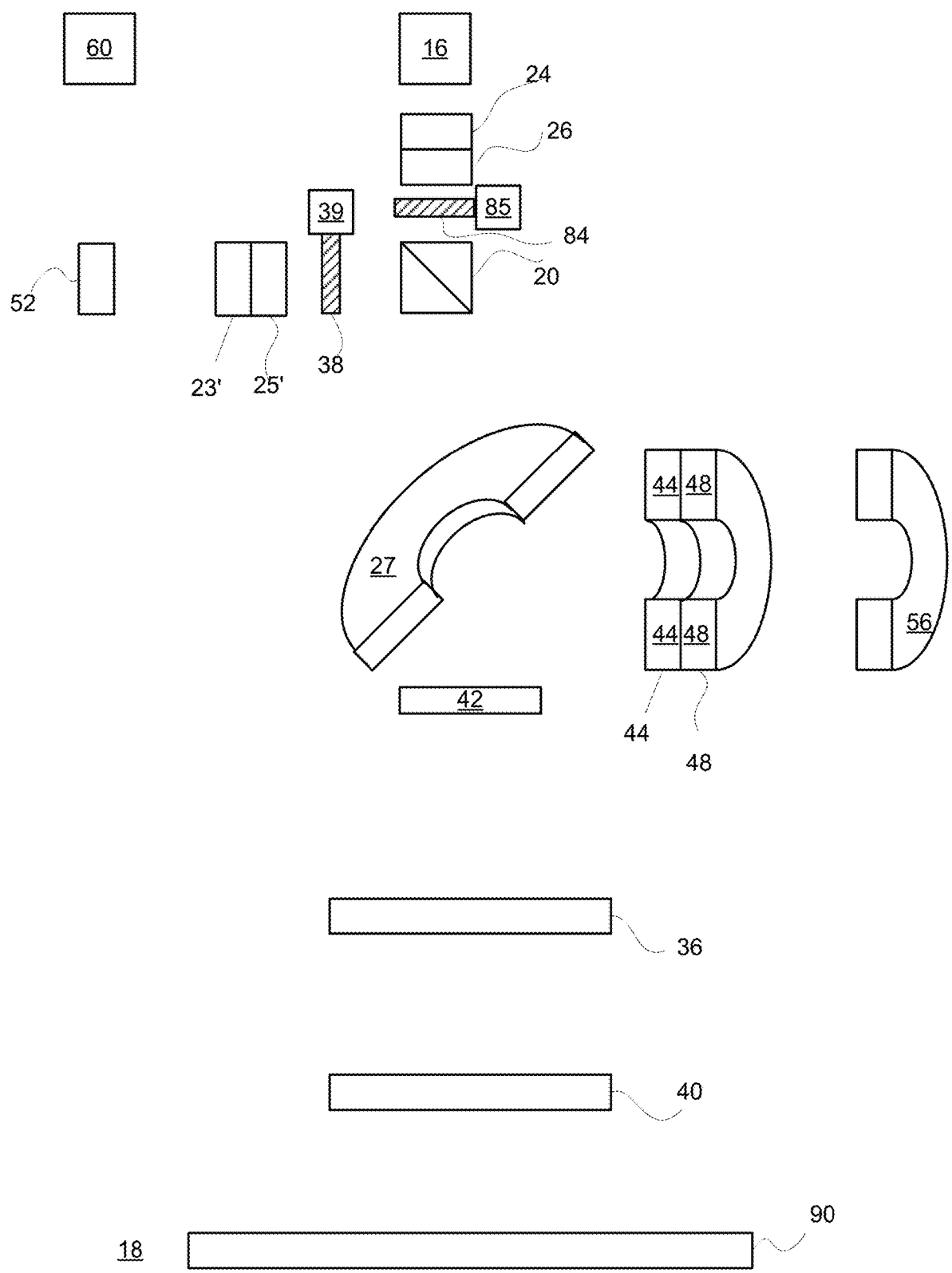
Figure 27:
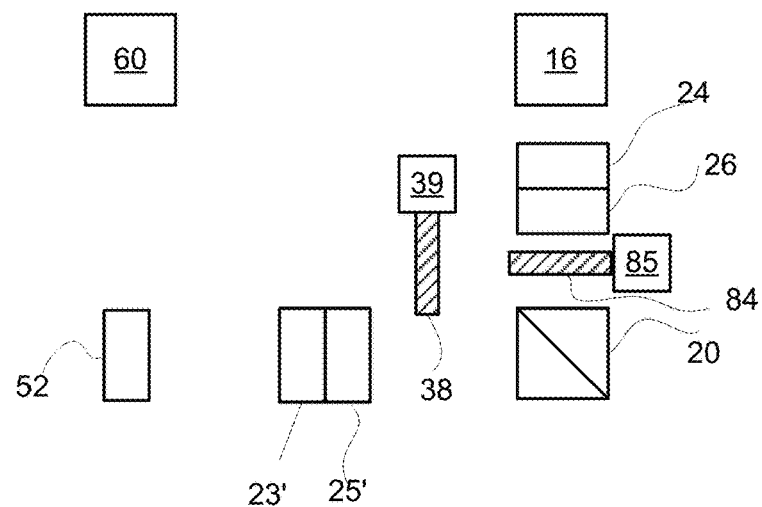
Figure 27:
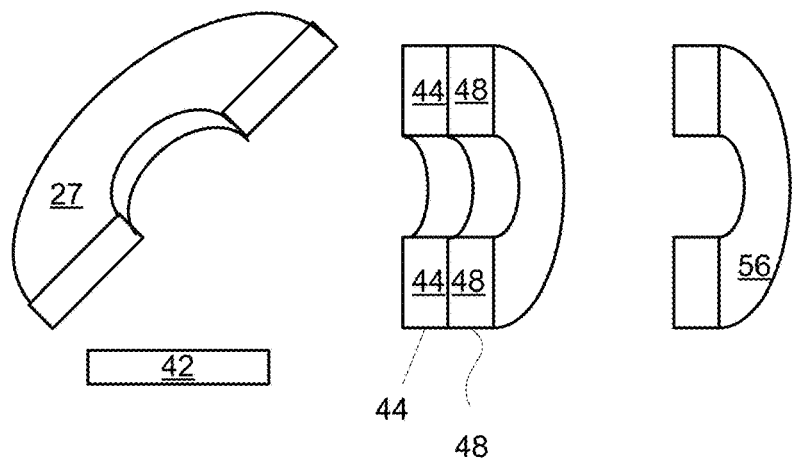
Figure 27:
Figure 27:
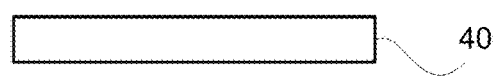
Figure 27:
Figure 28:
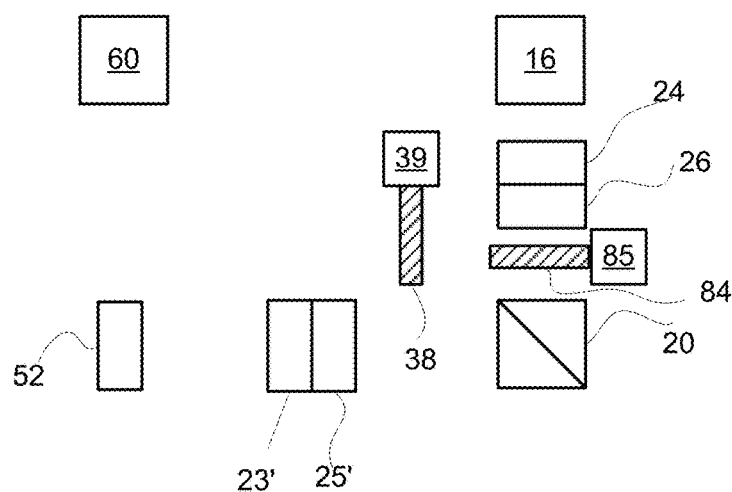
Figure 28:
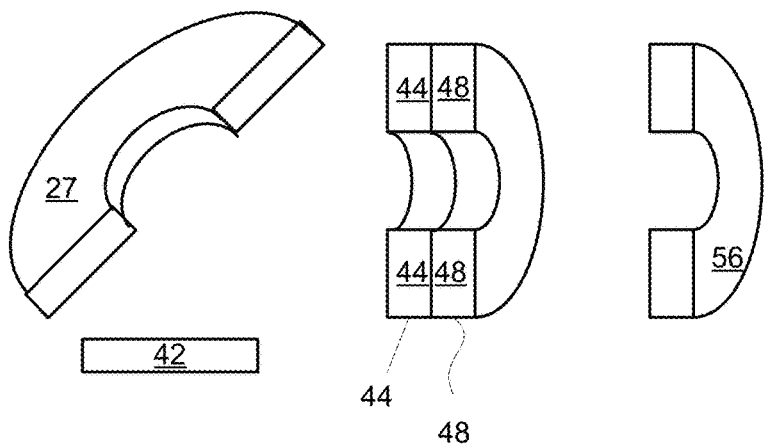
Figure 28:
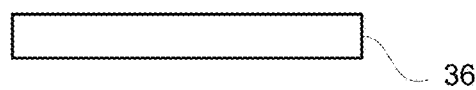
Figure 28:
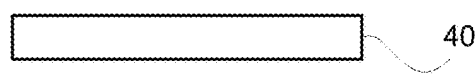
Figure 28:
Figure 29:
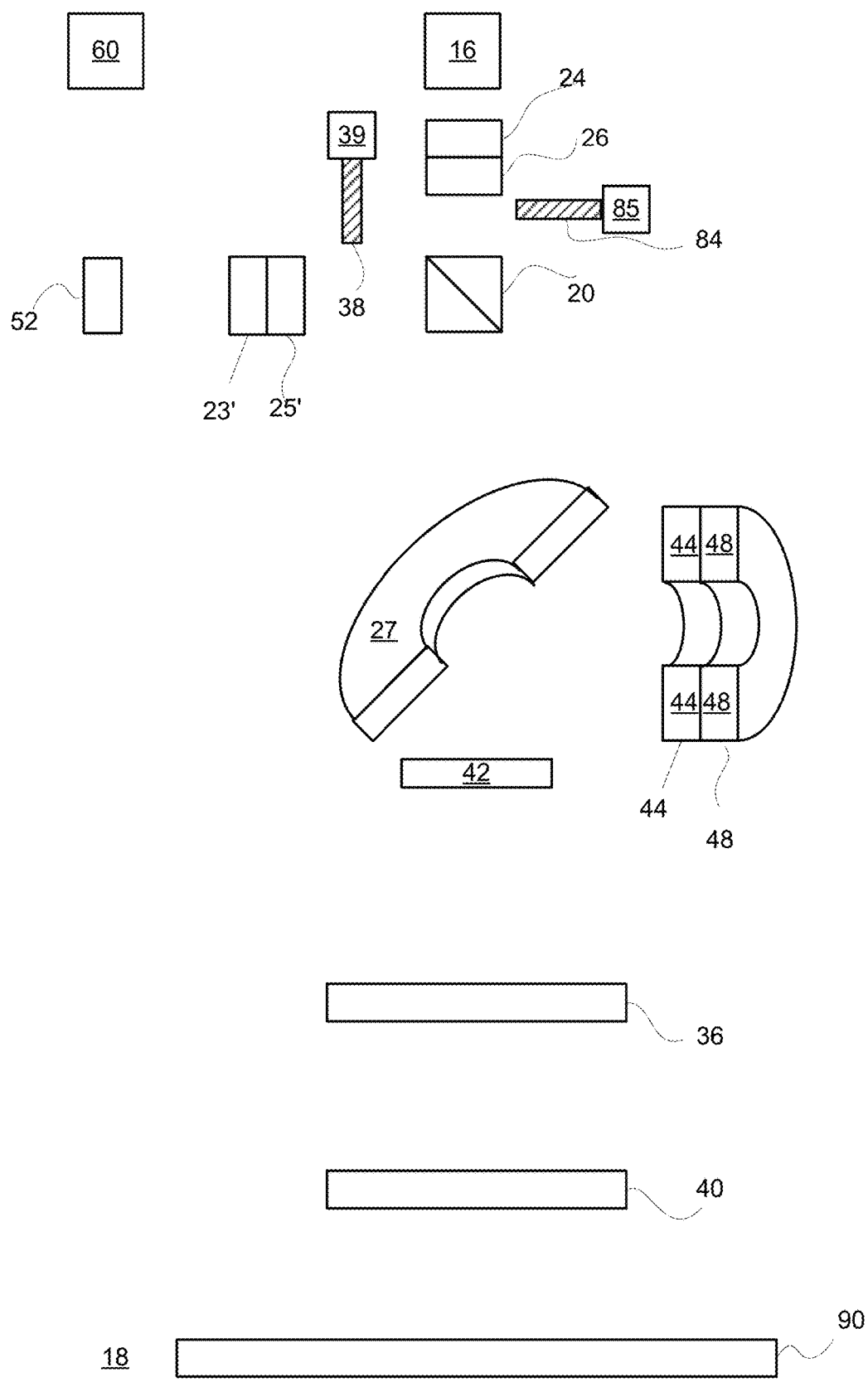
Figure 30:
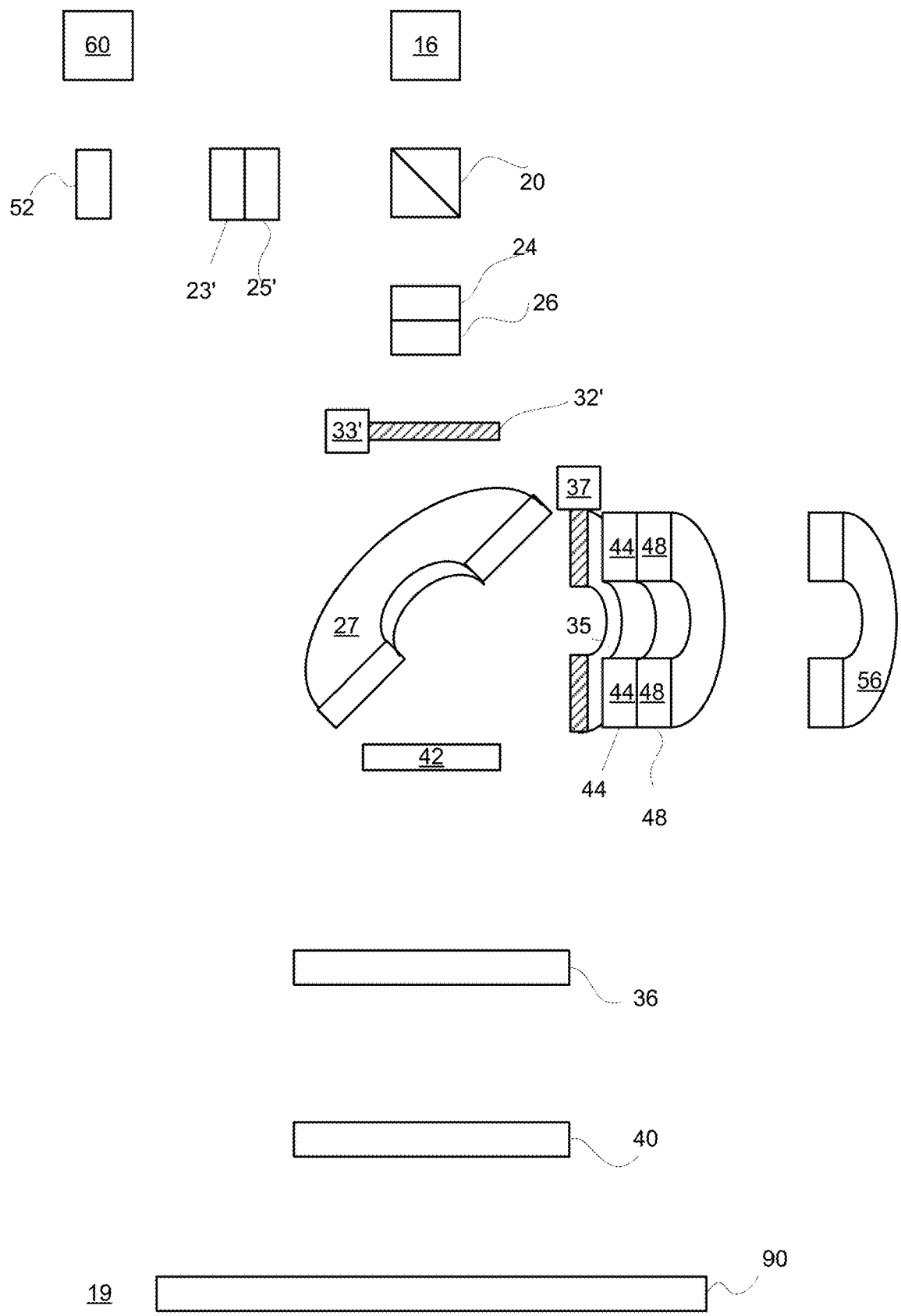
Figure 31:
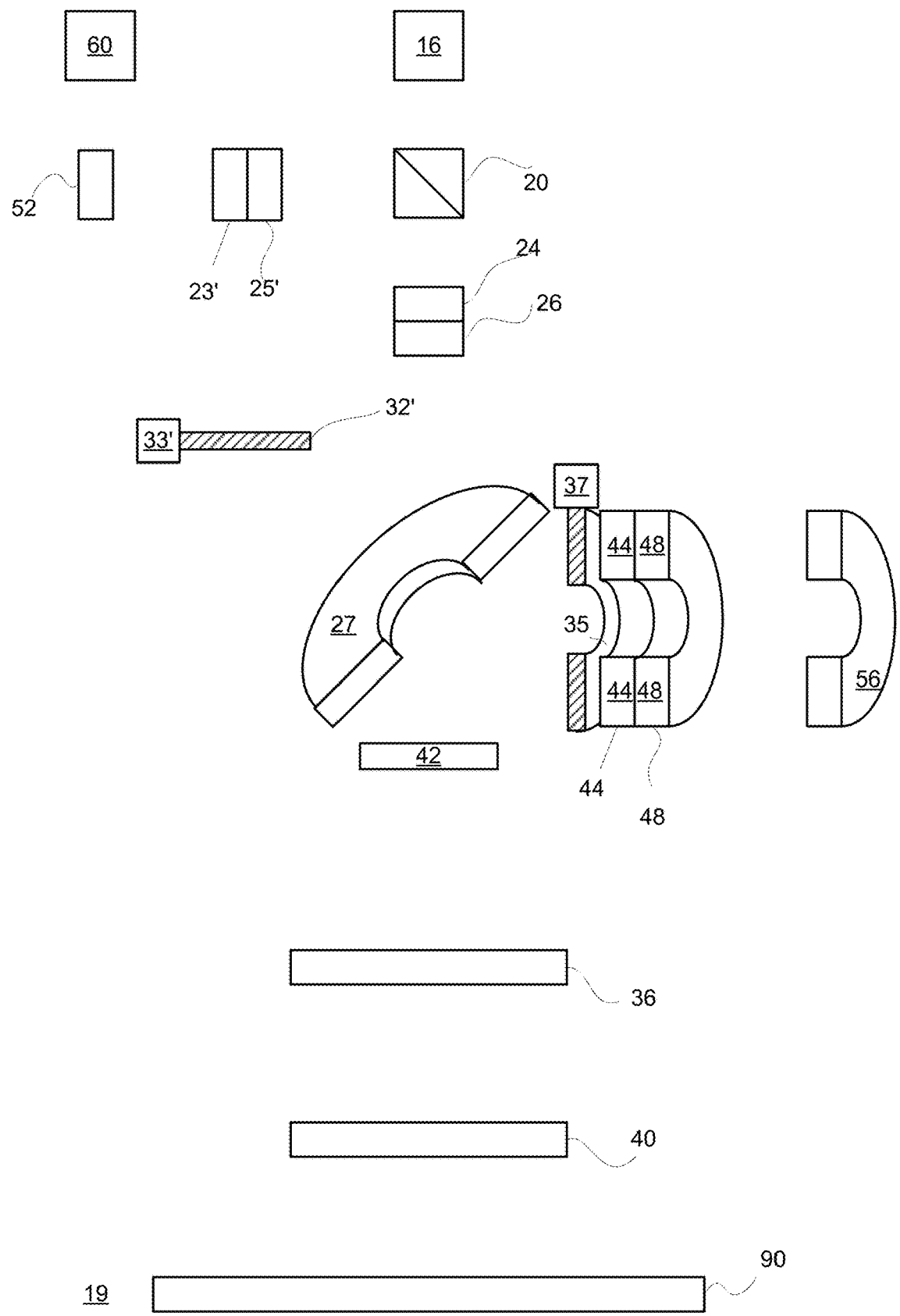
Figure 32:
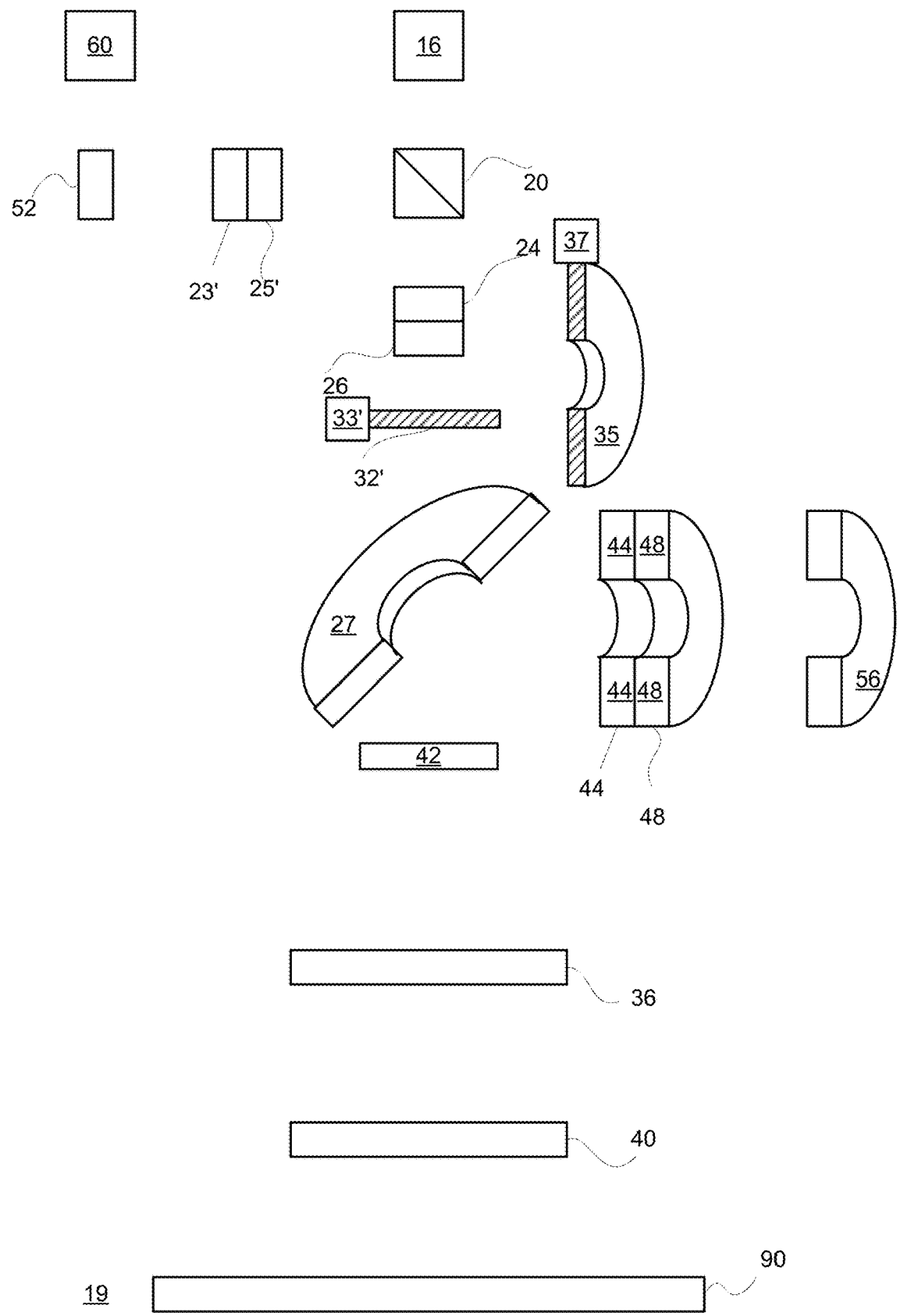
Figure 33:
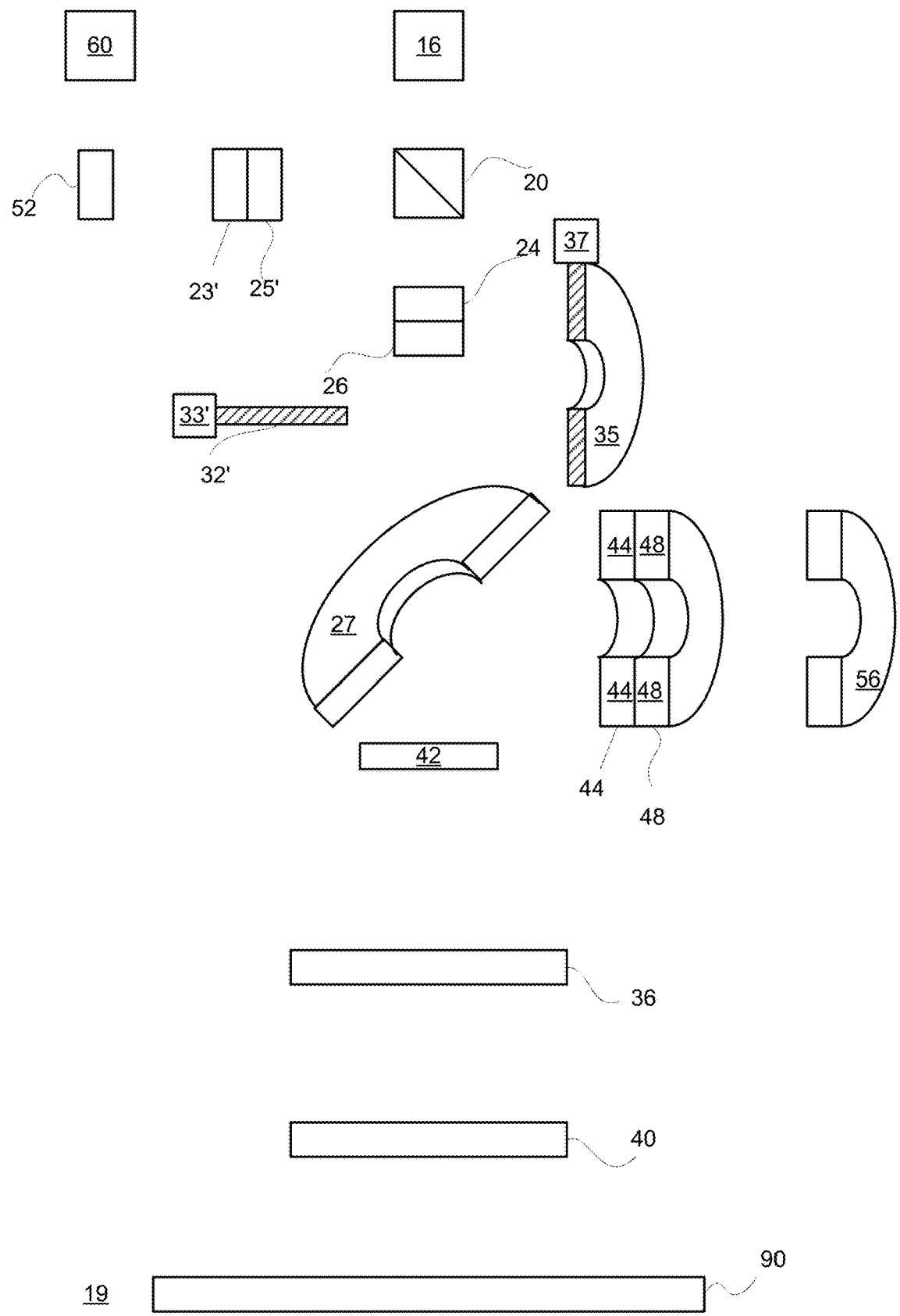
Figure 34:
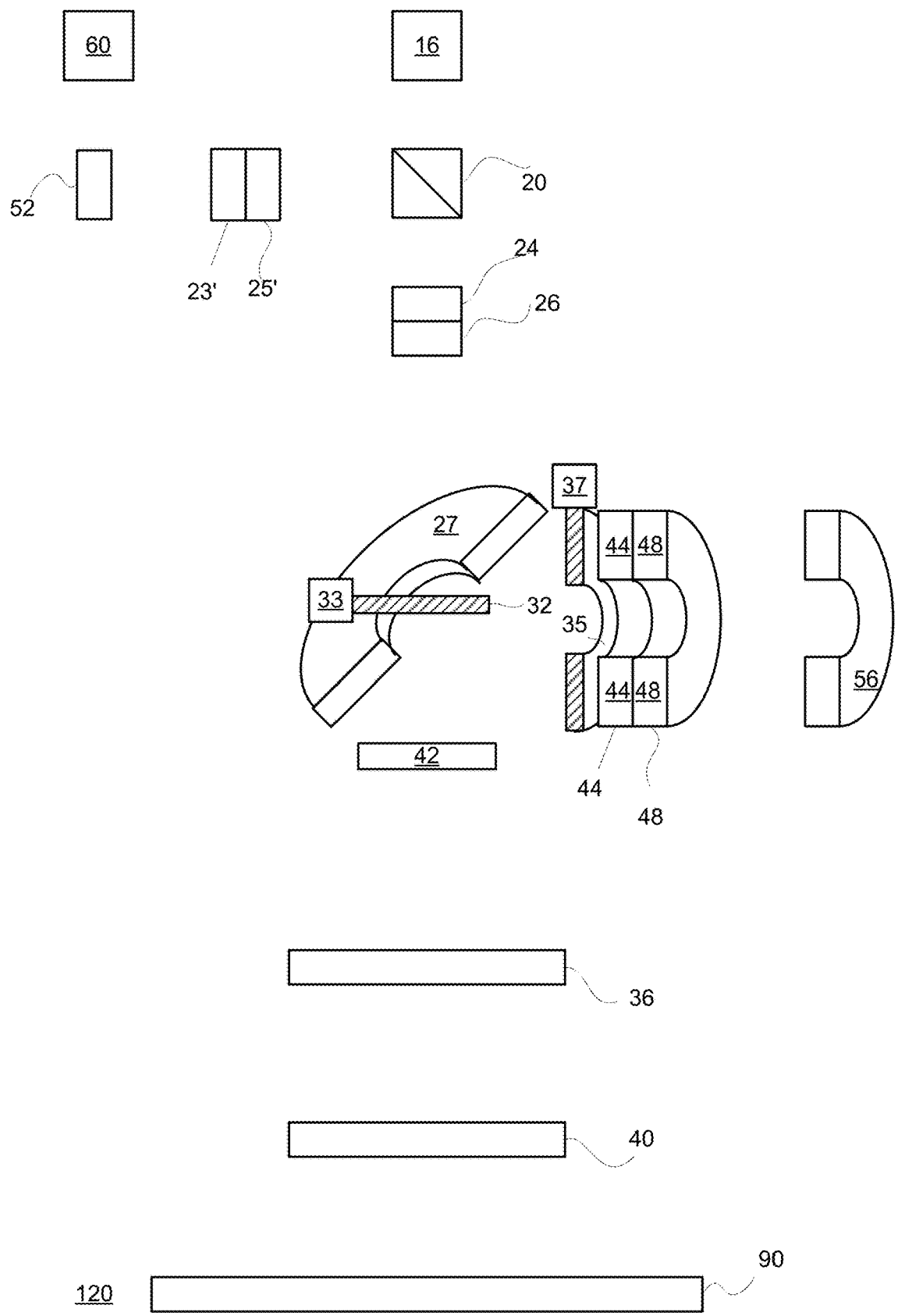
FIGS. 34-37 illustrate an example of an optical inspection system.
Figure 35:
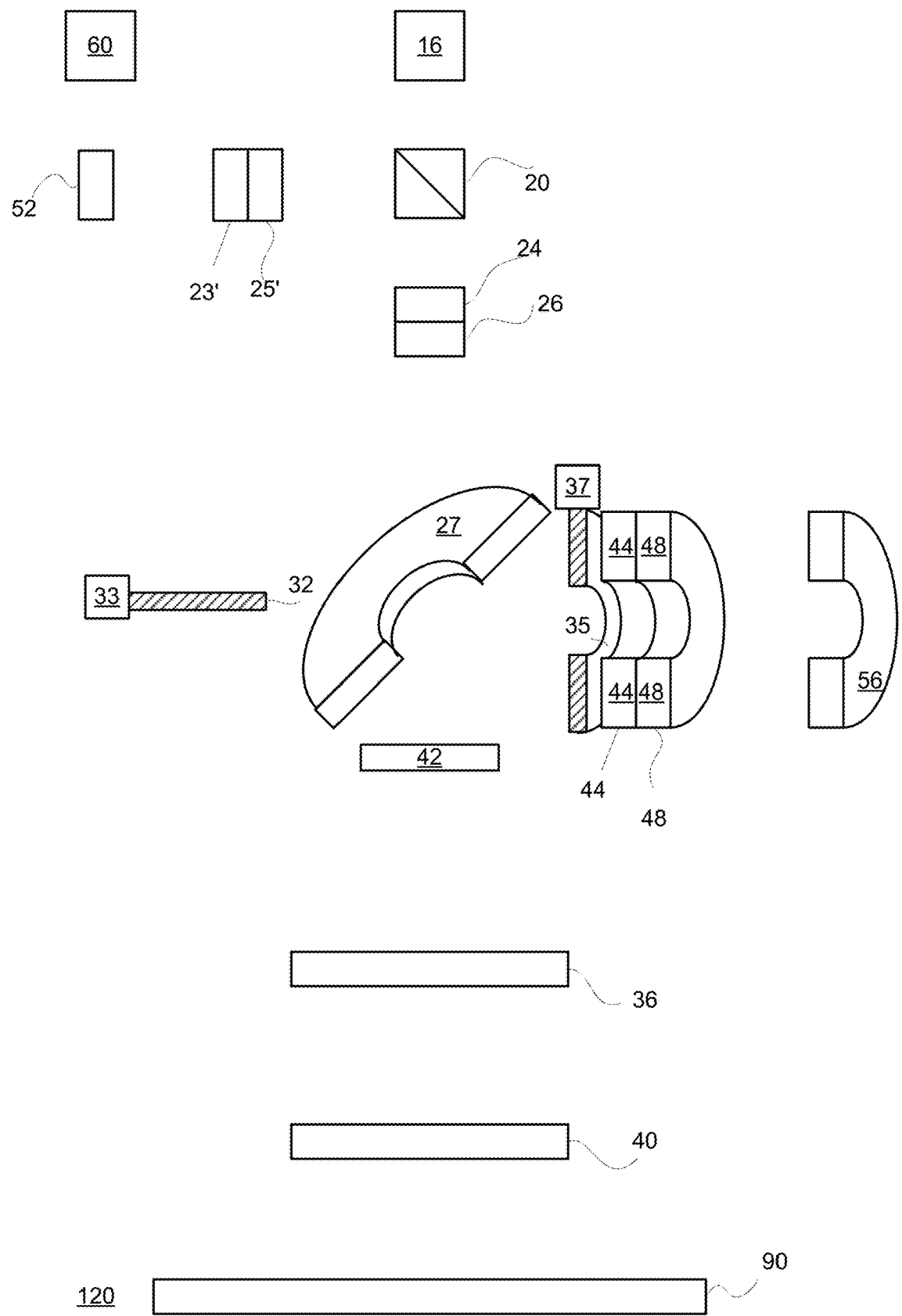
Figure 36:
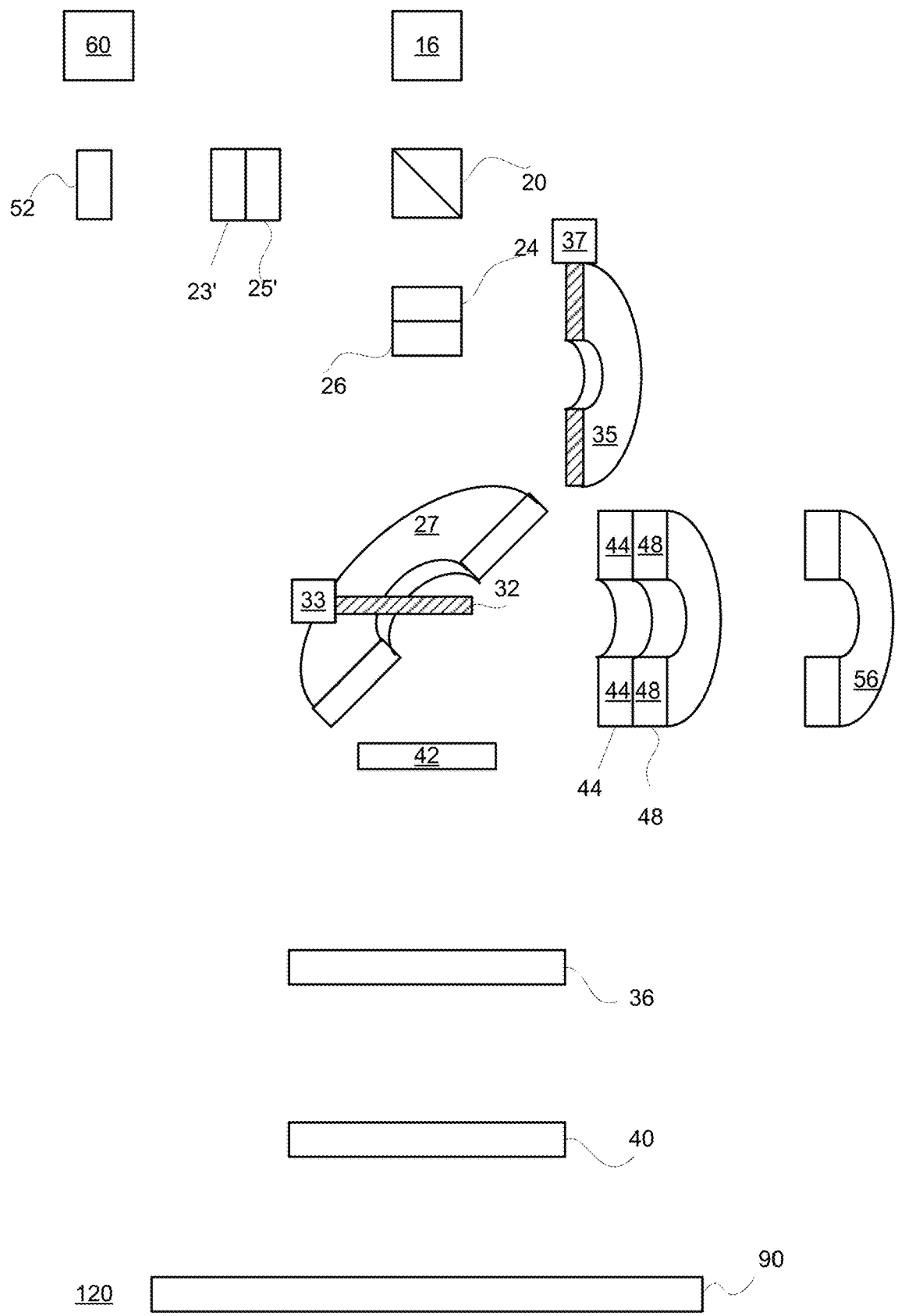
Figure 37:
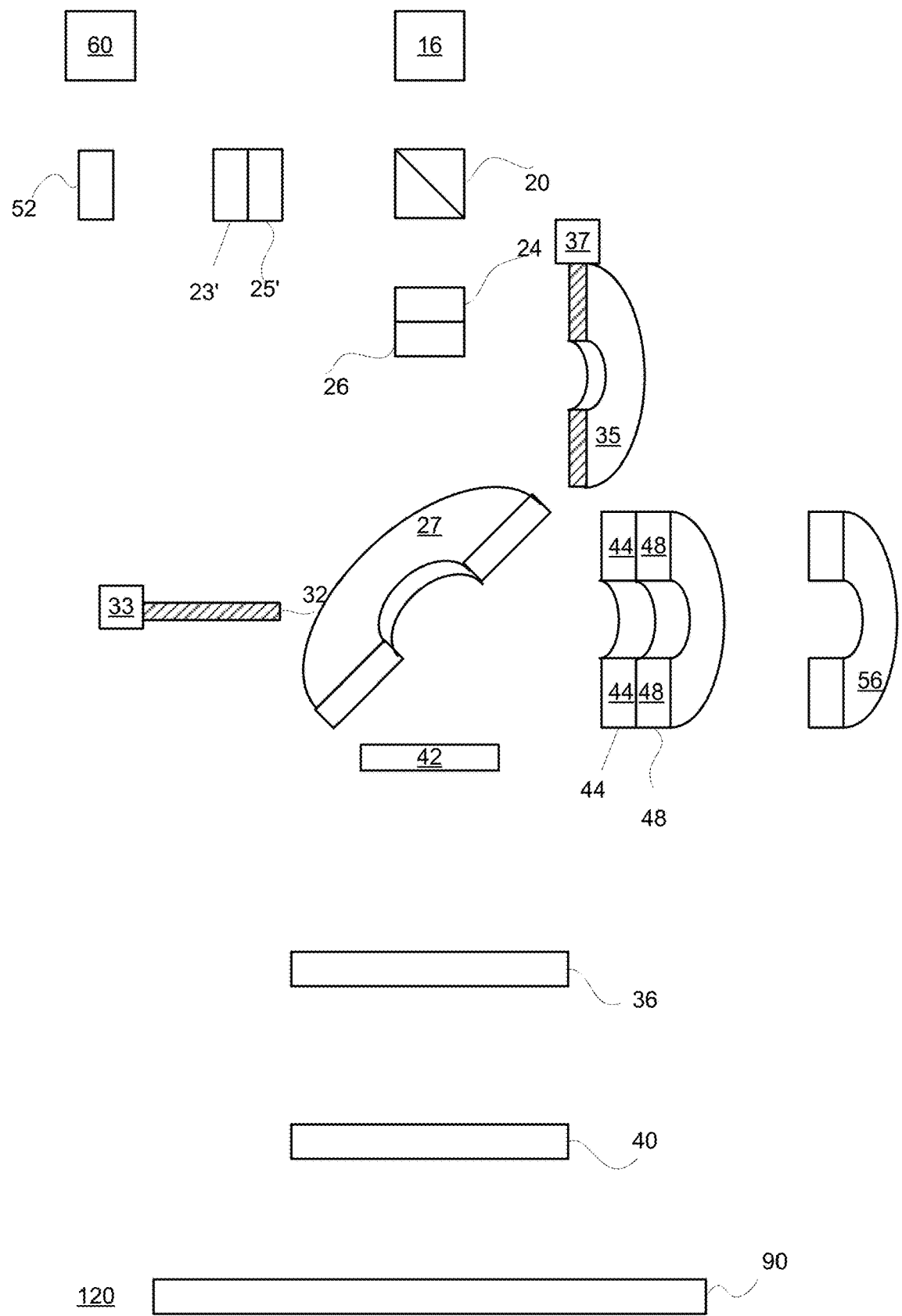
Figure 38:
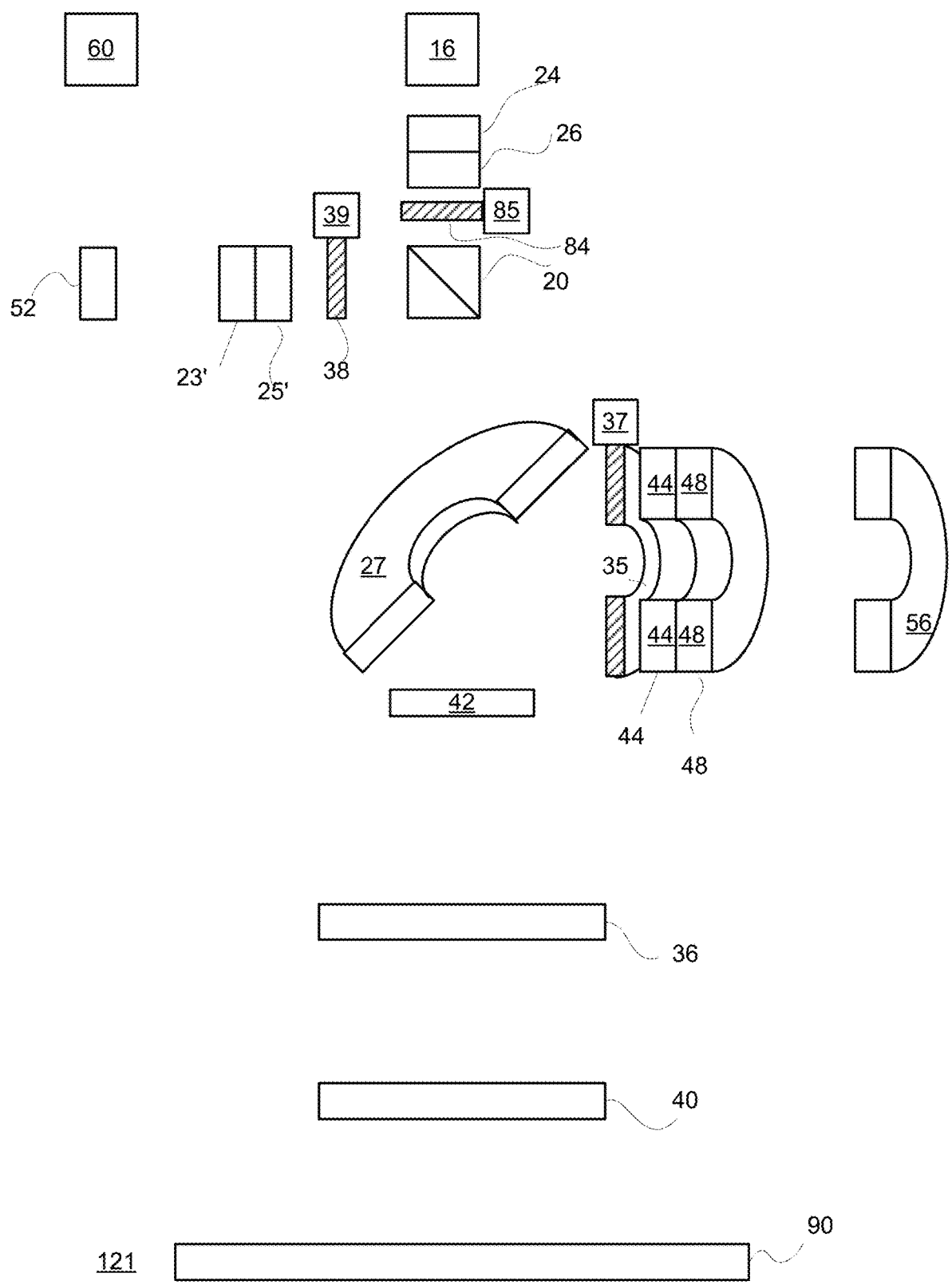
FIGS. 38-43 illustrate an example of an optical inspection system.
Figure 39:
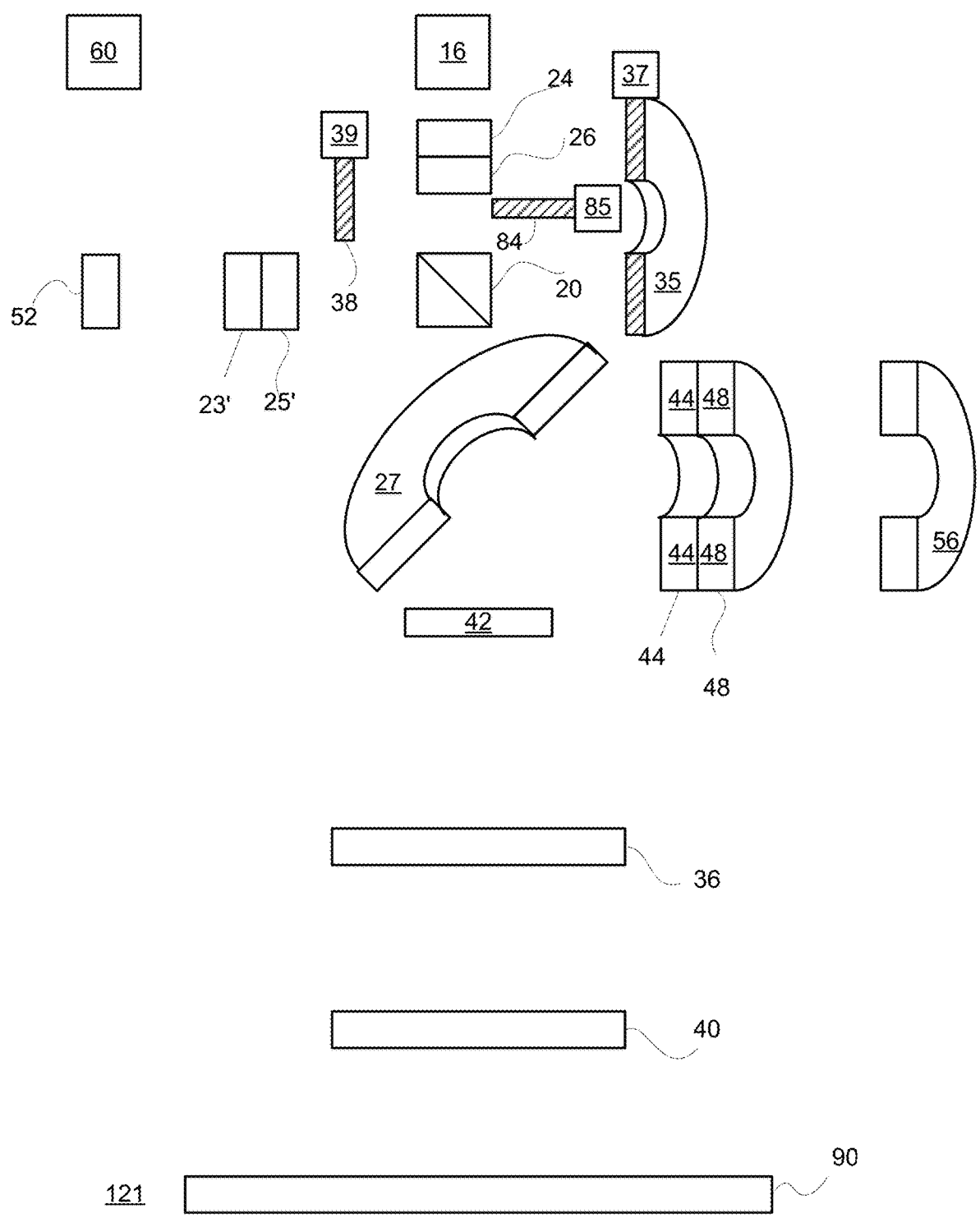
Figure 40:
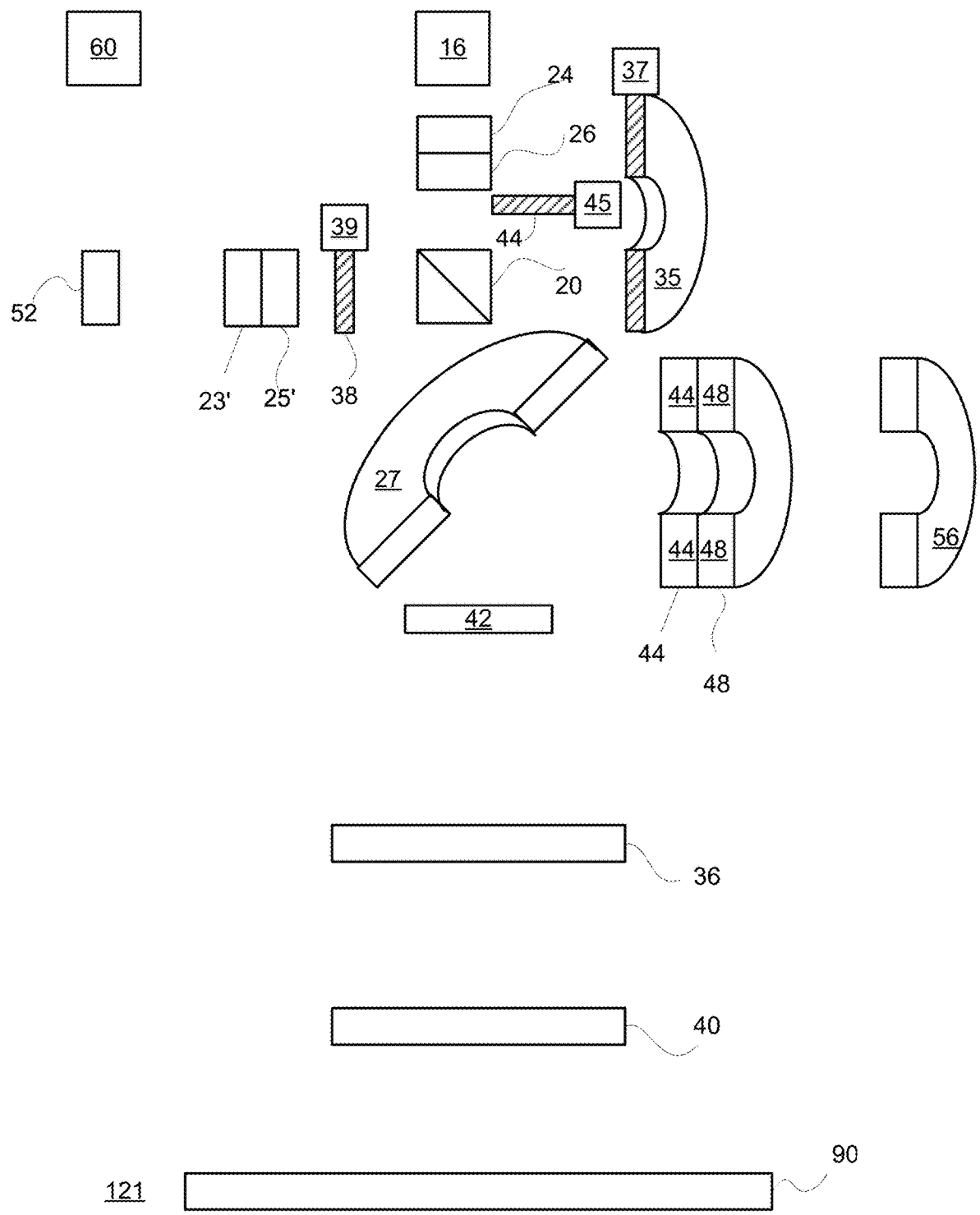
Figure 41:
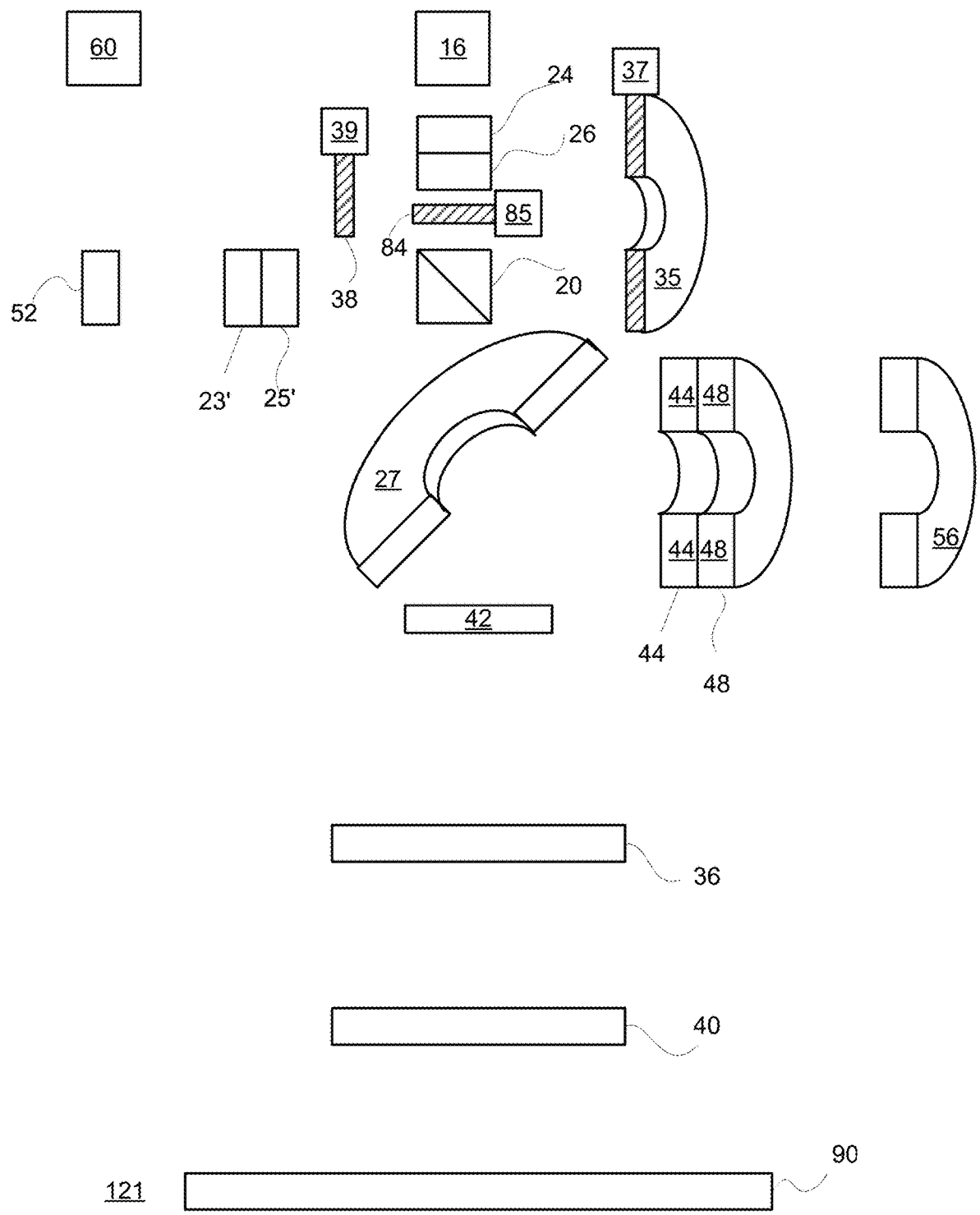
Figure 42:
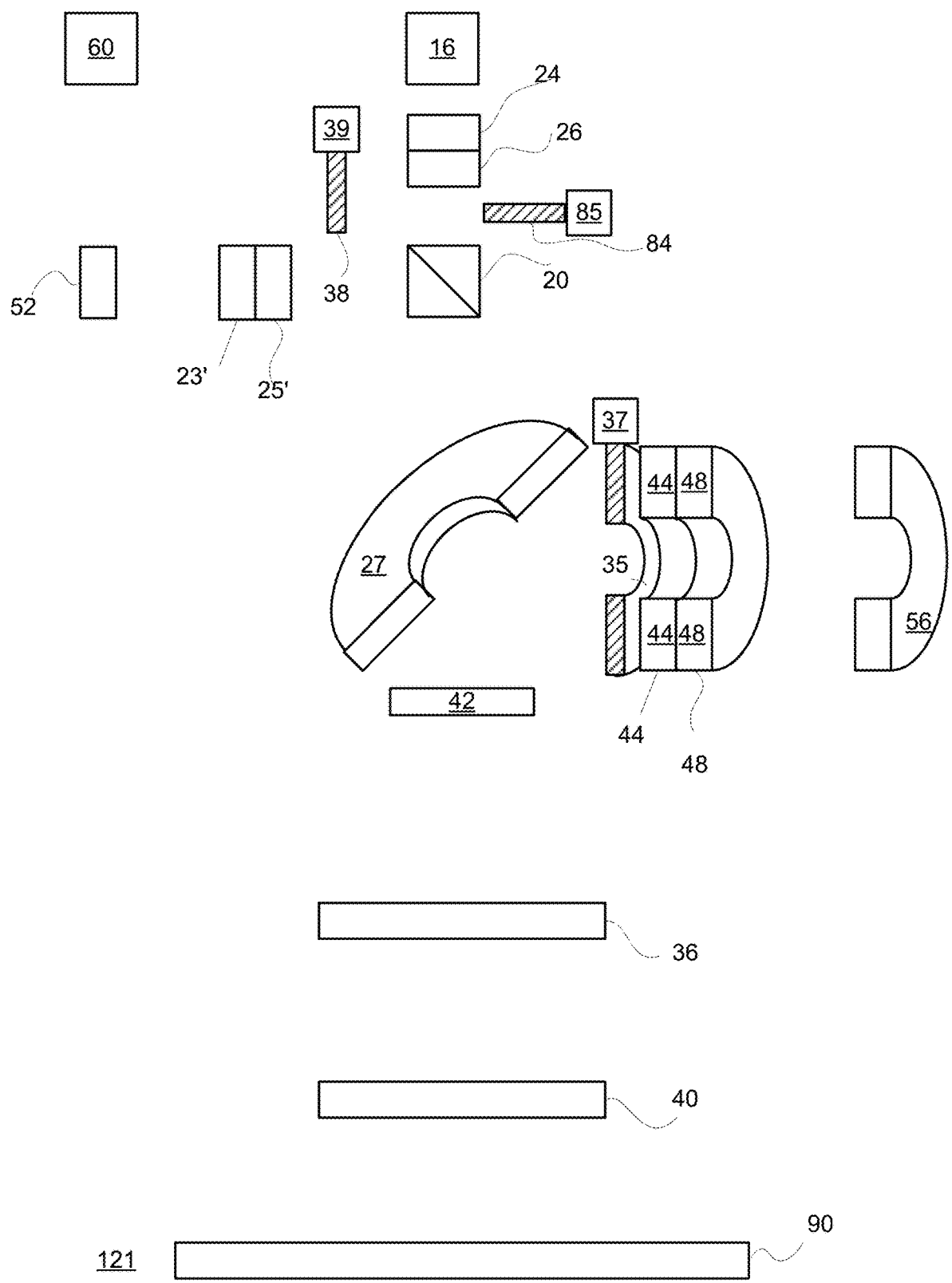
Figure 43:
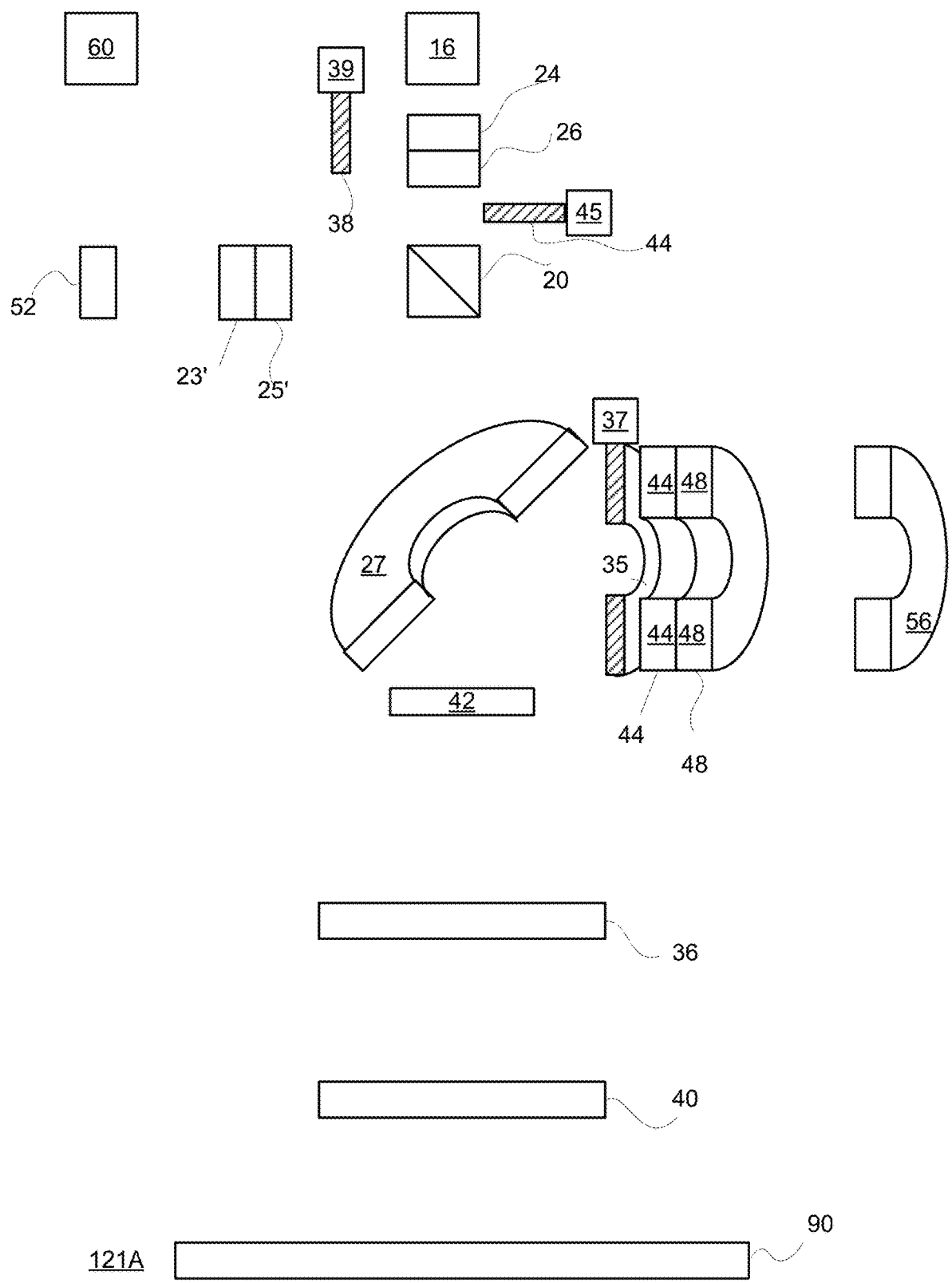

FIGS. 20-21 illustrate an example of optical inspection system 16 according to an embodiment.

Optical Inspection System 16 Differs from Optical System 10 of FIG. 1 by:
 Lacking an inhomogeneous polarizer in any of the collection paths.
 Having the first beam splitter 20 downstream to the first half-wave plate 24 and the first quarter-wave plate 26.
 Having a illumination optics inhomogeneous polarizer 84 (movable by illumination path movement unit 85) positioned between the first half-wave plate 24 and the first quarter-wave plate 26 and the first beam splitter 20.
 The illumination path movement unit 85 is configured to move illumination optics inhomogeneous polarizer 84 between a (i) a polarization-impacting position in which a polarization of the illumination light beam is impacted by the illumination optics inhomogeneous polarizer and (ii) a polarization-irrelevant position in which the polarization of the illumination light beams is not impacted by the by the inhomogeneous polarizer.

FIGS. 22-25 illustrate an example of optical inspection system 17 according to an embodiment.

Optical Inspection System 17 Differs from Optical System 10 of FIG. 1 by:
 Not having the first inhomogeneous polarizer and not having the first movement unit.
 Having the first beam splitter 20 downstream to the first half-wave plate 24 and the first quarter-wave plate 26.
 Having a illumination path inhomogeneous polarizer 84 (movable by illumination path movement unit 85) positioned between the first half-wave plate 24 and the first quarter-wave plate 26 and the first beam splitter 20.
 The illumination path movement unit 85 is configured to move illumination path inhomogeneous polarizer 84 between (i) a polarization-impacting position in which a polarization of the illumination light beam is impacted by the illumination optics inhomogeneous polarizer and (ii) a polarization-irrelevant position in which the polarization of the illumination light beams is not impacted by the by the inhomogeneous polarizer.
 Having a DF inhomogeneous polarizer 35 (movable by DF movement unit 37) positioned between the first beam splitter 20 and the third half-wave plate 25'. DF movement unit 37 is configured to move the DF inhomogeneous polarizer 35 between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer.

FIGS. 22-25 differ from each other by the positions of the illumination path inhomogeneous polarizer 84 and of the DF inhomogeneous polarizer 35.

FIGS. 26-29 illustrate an example of optical inspection system 18 according to an embodiment.

Optical Inspection System 18 Differs from Optical System 10 of FIG. 1 by:
 Not having the first inhomogeneous polarizer and not having the first movement unit.
 Having the first beam splitter 20 downstream to the first half-wave plate 24 and the first quarter-wave plate 26.
 Having a illumination path inhomogeneous polarizer 84 (movable by illumination path movement unit 85) positioned between the first half-wave plate 24 and the first quarter-wave plate 26 and the first beam splitter 20.
 The illumination path movement unit 85 is configured to move illumination path inhomogeneous polarizer 84 between (i) a polarization-impacting position in which a polarization of the illumination light beam is impacted by the illumination optics inhomogeneous polarizer and (ii) a polarization-irrelevant position in which the polarization of the illumination light beams is not impacted by the by the inhomogeneous polarizer.
 Having a BF inhomogeneous polarizer 38 (movable by BF movement unit 39) positioned between the second beam splitter 28 and second half-wave plate 44. BF movement unit 39 is configured to move the BF inhomogeneous polarizer 38 between a polarization-impacting position in which a polarization of the BF detected light beam is impacted by the BF inhomogeneous polarizer and a polarization-irrelevant position in which the polarization of the BF detected light beam is not impacted by the by the BF inhomogeneous polarizer.

FIGS. 26-29 differ from each other by the positions of the illumination path inhomogeneous polarizer 84 and of the BF inhomogeneous polarizer 38.

FIGS. 30-33 illustrate an example of optical inspection system 19 according to an embodiment.

Optical inspection system 17 differs from optical system 11 of FIG. 3 by:
 Having, in addition to the other inhomogeneous polarizer 32' (movable by second movement unit 33'), a DF inhomogeneous polarizer 35 (movable by DF movement unit 37) positioned between the first beam splitter 20, and the third half-wave plate 25'. DF movement unit 37 is configured to move the DF inhomogeneous polarizer 35 between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer.

FIGS. 30-33 differ from each other by the positions of the other inhomogeneous polarizer 32' and of the DF inhomogeneous polarizer 35.

FIGS. 34-37 illustrates an example of an optical inspection system 120 according to an embodiment.

Optical Inspection System 120 Differs from Optical System 10 of FIG. 1:
 Positioning the first inhomogeneous polarizer at the first pupil plane instead at the second pupil plane. Relay lens 42 is positioned between a first pupil plane and a second pupil plane. The first inhomogeneous polarizer is movable by first movement unit 33. The first movement unit 33 is configured to move the first inhomogeneous polarizer between a polarization-impacting position in which the polarization (of the illumination light beam and the BF detected light beam) is impacted by and a polarization-irrelevant position in which the polarization is not impacted.

Having a DF inhomogeneous polarizer 35 (movable by DF movement unit 37) positioned between the first beam splitter 20 and the third half-wave plate 25'. DF movement unit 37 is configured to move the DF inhomogeneous polarizer 35 between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer.

FIGS. 34-37 differ from each other by the positions of the first inhomogeneous polarizer and of the DF inhomogeneous polarizer 35.

FIGS. 38-43 illustrate an example of optical inspection system 121 according to an embodiment.

Optical Inspection System 121 Differs from Optical System 10 of FIG. 1 by:

Not having the first inhomogeneous polarizer and not having the first movement unit.

Having the first beam splitter 20 downstream to the first half-wave plate 24 and the first quarter-wave plate 26.

Having a illumination path inhomogeneous polarizer 84 (movable by illumination path movement unit 85) positioned between the first half-wave plate 24 and the first quarter-wave plate 26 and the first beam splitter 20. The illumination path movement unit 85 is configured to move illumination path inhomogeneous polarizer 84 between (i) a polarization-impacting position in which a polarization of the illumination light beam is impacted by the illumination optics inhomogeneous polarizer and (ii) a polarization-irrelevant position in which the polarization of the illumination light beams is not impacted by the by the inhomogeneous polarizer.

Having a DF inhomogeneous polarizer 35 (movable by DF movement unit 37) positioned between the first beam splitter 20 and the third half-wave plate 25'. DF movement unit 37 is configured to move the DF inhomogeneous polarizer 35 between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer.

Having a BF inhomogeneous polarizer 38 (movable by BF movement unit 39) positioned between the second beam splitter 28 and second half-wave plate 44. BF movement unit 39 is configured to move the BF inhomogeneous polarizer 38 between a polarization-impacting position in which a polarization of the BF detected light beam is impacted by the BF inhomogeneous polarizer and a polarization-irrelevant position in which the polarization of the BF detected light beam is not impacted by the by the BF inhomogeneous polarizer.

FIGS. 38-43 differ from each other by the positions of the BF inhomogeneous polarizer 38, of the DF inhomogeneous polarizer 35 and of the illumination path inhomogeneous polarizer 84.

It should be noted that the first inhomogeneous polarizer 32 of FIGS. 1-3, 10, 31-37, is an example of a shared inhomogeneous polarizer. First movement unit 33 is an example of a shared movement unit.

It should be noted that any of the systems may include linear polarizers upstream to one or more detectors. For example—a BF linear polarizer between a BF sensor and any other BF polarizer (for example the half-wave plate or the quarter-wave plate). Yet for another example—a DF linear polarizer between a DF sensor and any other DF polarizer (for example the half-wave plate or the quarter-wave plate).

It should be noted that the BF polarizers may not include any quarter-wave plate and/or that the DF polarizers may not include any quarter-wave plate.

Figure 44:
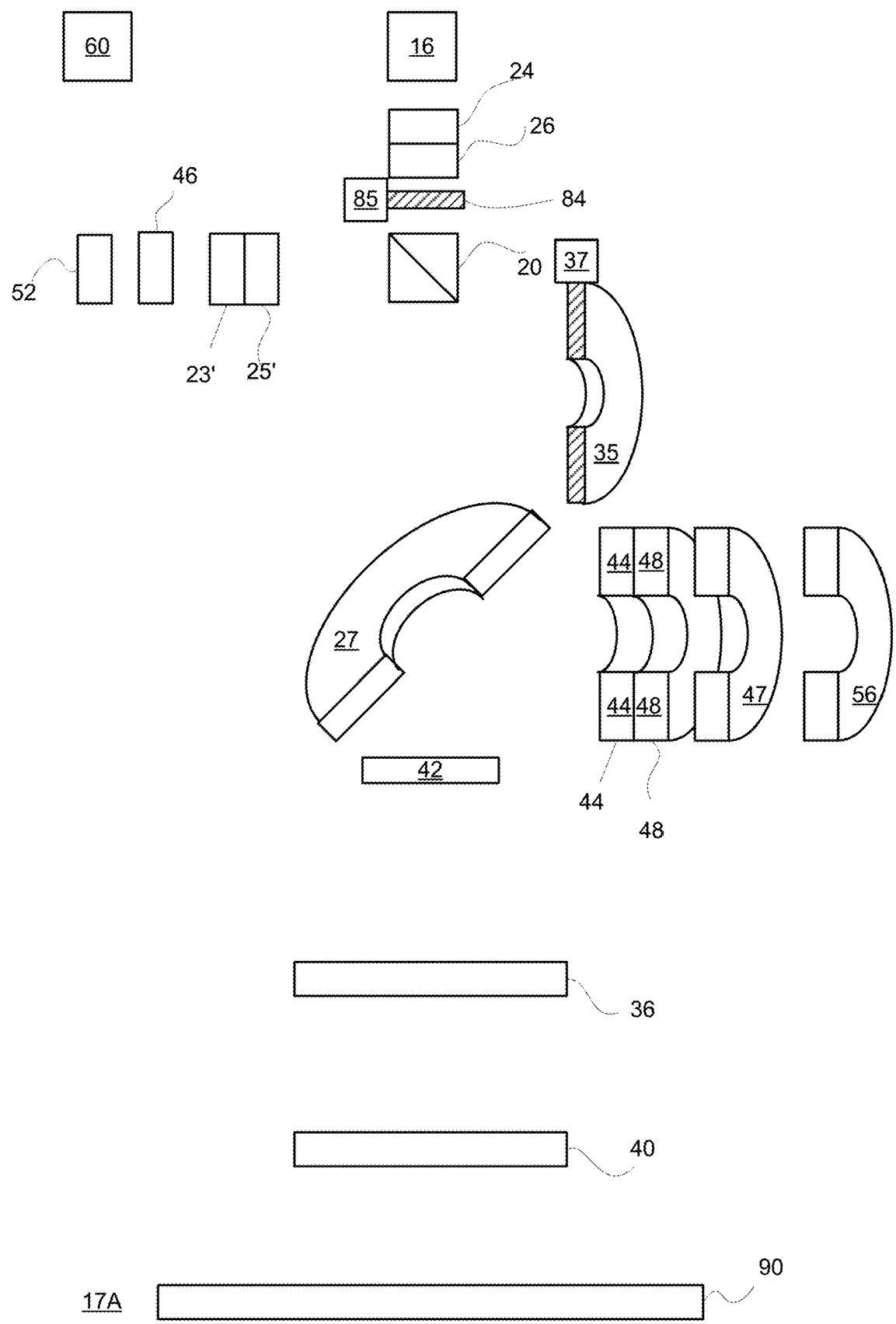
FIG. 44 illustrates an example of an optical inspection system.

FIG. 44 illustrates an example of optical inspection system 17A according to an embodiment.

Optical Inspection System 17A Differs from Optical System 10 of FIG. 1 by:

Lacking a inhomogeneous polarizer in the illumination path.

Including BF linear polarizer 46 between third quarter-wave plate 23' and first detector 52.

Including DF linear polarizer 47 between second quarter-wave plate 48 and second detector 56.

Having a BF inhomogeneous polarizer 38 (movable by BF movement unit 39) positioned between the second beam splitter 28 and second half-wave plate 44. BF movement unit 39 is configured to move the BF inhomogeneous polarizer 38 between a polarization-impacting position in which a polarization of the BF detected light beam is impacted by the BF inhomogeneous polarizer and a polarization-irrelevant position in which the polarization of the BF detected light beam is not impacted by the by the BF inhomogeneous polarizer.

Figure 45:
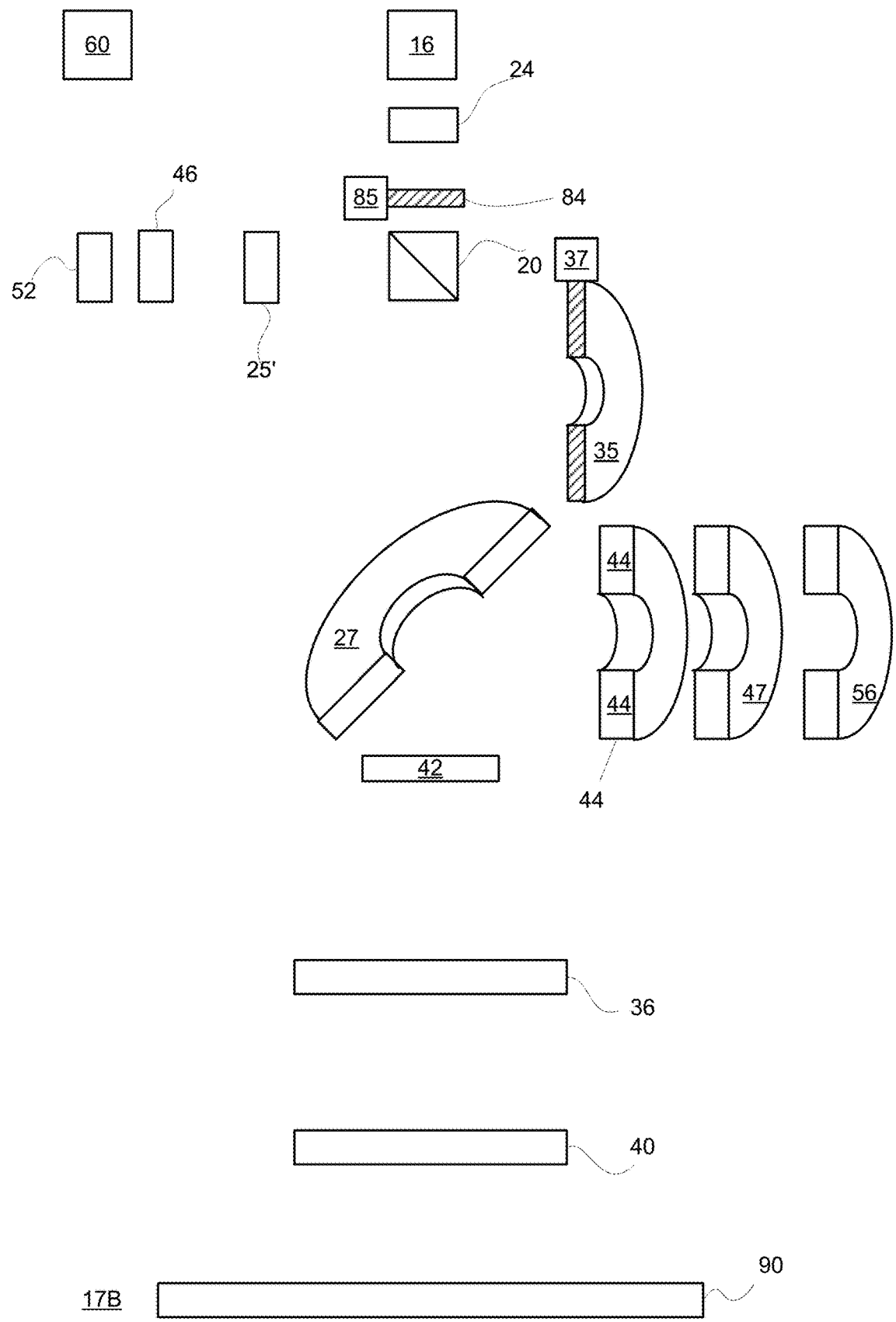
FIG. 45 illustrates an example of an optical inspection system.

FIG. 45 illustrates an example of optical inspection system 17B according to an embodiment.

Optical Inspection System 17B Differs from Optical System 10 of FIG. 1 by:

Lacking a inhomogeneous polarizer in the illumination path.

Lacking any quarter-wave plate in any of the collection optics.

Including BF linear polarizer 46 between third quarter-wave plate 23' and first detector 52.

Including DF linear polarizer 47 between second quarter-wave plate 48 and second detector 56.

Having a BF inhomogeneous polarizer 38 (movable by BF movement unit 39) positioned between the second beam splitter 28 and second half-wave plate 44. BF movement unit 39 is configured to move the BF inhomogeneous polarizer 38 between a polarization-impacting position in which a polarization of the BF detected light beam is impacted by the BF inhomogeneous polarizer and a polarization-irrelevant position in which the polarization of the BF detected light beam is not impacted by the by the BF inhomogeneous polarizer.

In the forgoing detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method.

Any reference in the specification to a system should be applied mutatis mutandis to a method that may be executed by the system.

The term "and/or" means additionally or alternatively.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, a plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. An optical inspection system, comprising:
   an illumination optics that is configured to generate an illumination light beam and to illuminate a sample with the illumination light beam;

at least one collection optics configured to collect light from the sample as a result of an impingement of the illumination light beam on the sample, the at least one collection optics comprising a bright field (BF) collection optics and a dark field (DF) collection optics;

at least one detector configured to detect at least one detected light beam outputted from the at least one collection optics, wherein the at least one detected light beam comprises at least one BF detected light beam and at least one DF detected light beam;

multiple polarizers that comprise at least one inhomogeneous polarizer and at least one half-wave plate; and at least one movement unit that is configured to move, under a control of a control unit of the optical inspection system, the at least one inhomogeneous polarizer thereby impacting a polarization of one or more light beams out of the illumination light beam, and the at least one detected light beam, wherein the at least one inhomogeneous polarizer comprises a BF inhomogeneous polarizer that is movable by a BF movement unit and a DF inhomogeneous polarizer that is movable by a DF movement unit, wherein the BF inhomogeneous polarizer is movable by the BF movement unit between a polarization-impacting position in which the polarization of the BF detected light beam is impacted by the BF inhomogeneous polarizer and a polarization-irrelevant position in which the polarization of the BF detected light beam is not impacted by the BF inhomogeneous polarizer, wherein the DF inhomogeneous polarizer is movable by the DF movement unit between a polarization-impacting position in which the polarization of the DF detected light beam is impacted by the DF inhomogeneous polarizer and a polarization-irrelevant position in which the polarization of the DF detected light beam is not impacted by the DF inhomogeneous polarizer.

2. The optical inspection system according to claim 1, wherein the at least one inhomogeneous polarizer comprises an illumination optics inhomogeneous polarizer that is movable by an illumination optics movement unit between (i) a polarization-impacting position in which a polarization of the illumination light beam is impacted by the illumination optics inhomogeneous polarizer and (ii) a polarization-irrelevant position in which the polarization of the illumination light beam is not impacted by the inhomogeneous polarizer.

3. An optical inspection system, comprising;
an illumination optics that is configured to generate an illumination light beam and to illuminate a sample with the illumination light beam;

at least one collection optics configured to collect light from the sample as a result of an impingement of the illumination light beam on the sample, the at least one collection optics comprising a bright field (BF) collection optics and a dark field (DF) collection optics;

at least one detector configured to detect at least one detected light beam outputted from the at least one collection optics;

multiple polarizers that comprise at least one inhomogeneous polarizer and at least one half-wave plate; and at least one movement unit that is configured to move, under control of a control unit of the optical inspection system, the at least one inhomogeneous polarizer thereby impacting a polarization of one or more light beams out of the illumination light beam, and the at least one detected light beam, wherein the at least one inhomogeneous polarizer comprises a shared inhomogeneous polarizer that is shared between the illumination optics and a collection path, the shared inhomogeneous polarizer is movable by a shared inhomogeneous polarizer movement unit between a polarization-impacting position in which a polarization of the illumination light beam and a light beam of the collection path is impacted by the shared inhomogeneous polarizer and a polarization-irrelevant position in which the polarization of the illumination light beam and the light beam of the collection path is not impacted by the shared inhomogeneous polarizer.

4. The optical inspection system according to claim 3, wherein the at least one detected light beam comprises a BF detected light beam.

5. The optical inspection system according to claim 4, wherein the at least one inhomogeneous polarizer comprises a BF inhomogeneous polarizer that is movable by a BF movement unit between a polarization-impacting position in which a polarization of the BF detected light beam is impacted by the BF inhomogeneous polarizer and a polarization-irrelevant position in which the polarization of the BF detected light beam is not impacted by the BF inhomogeneous polarizer.

6. The optical inspection system according to claim 3, wherein the at least one detected light beam comprises a DF detected light beam.

7. The optical inspection system according to claim 6, wherein the at least one inhomogeneous polarizer comprises a DF inhomogeneous polarizer that is movable by a DF movement unit between a polarization-impacting position in which the polarization of the DF detected light beam is impacted by the DF inhomogeneous polarizer and a polarization-irrelevant position in which the polarization of the DF detected light beam is not impacted by the DF inhomogeneous polarizer.

8. The optical inspection system according to claim 3, wherein the at least one detected light beam comprises at least one of a BF detected light beam and a DF detected light beam.

9. The optical inspection system according to claim 8, wherein the at least one inhomogeneous polarizer comprises a BF inhomogeneous polarizer that is movable by a BF movement unit between a polarization-impacting position in which a polarization of the BF detected light beam is impacted by the BF inhomogeneous polarizer and a polarization-irrelevant position in which the polarization of the BF detected light beam is not impacted by the BF inhomogeneous polarizer.

10. The optical inspection system according to claim 1, wherein the optical inspection system lacks any inhomogeneous polarizer other than the BF inhomogeneous polarizer and the DF inhomogeneous polarizer.

11. The optical inspection system according to claim 8, wherein the at least one inhomogeneous polarizer comprises a DF inhomogeneous polarizer that is movable by a DF movement unit between a polarization-impacting position in which the polarization of the DF detected light beam is impacted by the DF inhomogeneous polarizer and a polarization-irrelevant position in which the polarization of the DF detected light beam is not impacted by the DF inhomogeneous polarizer.

12. The optical inspection system according to claim 11, wherein the optical inspection system lacks any inhomogeneous polarizer other than the DF inhomogeneous polarizer.

13. The optical inspection system according to claim 8, wherein the at least one inhomogeneous polarizer comprises a BF inhomogeneous polarizer that is movable by a BF movement unit and a DF inhomogeneous polarizer that is movable by a DF movement unit;
- wherein the DF inhomogeneous polarizer is movable by the DF movement unit between a polarization-impacting position in which the polarization of the DF detected light beam is impacted by the DF inhomogeneous polarizer and a polarization-irrelevant position in which the polarization of the DF detected light beam is not impacted by the by the DF inhomogeneous polarizer; and
- wherein the BF inhomogeneous polarizer is movable by the BF movement unit between a polarization-impacting position in which the polarization of the BF detected light beam is impacted by the BF inhomogeneous polarizer and a polarization-irrelevant position in which the polarization of the BF detected light beam is not impacted by the BF inhomogeneous polarizer.

14. The optical inspection system according to claim 3, wherein the at least one inhomogeneous polarizer is shared between the illumination optics and the DF collection optics.

15. The optical inspection system according to claim 3, wherein the at least one inhomogeneous polarizer is shared between the illumination optics and the BF collection optics.

16. The optical inspection system according to claim 3, wherein the shared inhomogeneous polarizer is located at a first pupil plane that virtually crosses a center of a beam splitter that is shared by the illumination optics and the at least one collection optics.

17. The optical inspection system according to claim 3, wherein the shared inhomogeneous polarizer is located between a first pupil plane of a beam splitter that is shared by the illumination optics and the at least one collection optics.

18. The optical inspection system according to claim 3, wherein the at least one inhomogeneous polarizer comprises an illumination optics inhomogeneous polarizer that is movable by an illumination optics inhomogeneous polarizer movement unit and at least one of an BF inhomogeneous polarizer that is movable by a BF movement unit, and a DF inhomogeneous polarizer that is movable by a DF movement unit.

19. The optical inspection system according to claim 18 wherein the at least one inhomogeneous polarizer comprises the illumination optics inhomogeneous polarizer, the BF inhomogeneous polarizer and the DF inhomogeneous polarizer.

20. The optical inspection system according to claim 18 wherein the at least one inhomogeneous polarizer comprises the illumination optics inhomogeneous polarizer and only one of the BF inhomogeneous polarizer and the DF inhomogeneous polarizer.

21. A method for inspecting a sample, the method comprising:
- generating, by an illumination optics, an illumination light beam;
- illuminating a sample with the illumination light beam;
- collecting, by at least one collection optics comprising a bright field (BF) collection optics and a dark field (DF) collection optics, light from the sample, wherein the light resulted from the illuminating of the sample, to provide at least one detected light beam;
- detecting, by at least one detector, the at least one detected light beam, wherein the at least one detected light beam comprises at least one BF detected light beam and at least one DF detected light beam;
- impacting, by at least one movement unit, a polarization of one or more light beams out of the illumination light beam, and the at least one detected light beam by controlling a location of at least one inhomogeneous polarizer;
- impacting, by a BF movement unit, a polarization of the BF detected light beam by controlling a location of a BF inhomogeneous polarizer between a polarization-impacting position in which the polarization of the BF detected light beam is impacted by the BF inhomogeneous polarizer and a polarization-irrelevant position in which the polarization of the BF detected light beam is not impacted by the BF inhomogeneous polarizer; and
- impacting, by a DF movement unit, a polarization of the DF detected light beam by controlling a location of a DF inhomogeneous polarizer between a polarization-impacting position in which the polarization of the DF detected light beam is impacted by the DF inhomogeneous polarizer and a polarization-irrelevant position in which the polarization of the DF detected light beam is not impacted by the DF inhomogeneous polarizer.

* * * * *